(12) United States Patent
Leitzke et al.

(10) Patent No.: US 6,637,214 B1
(45) Date of Patent: Oct. 28, 2003

(54) FROZEN CUSTARD MACHINE

(75) Inventors: Daniel W. Leitzke, Waukesha, WI (US); Patrick J. Martello, Brookfield, WI (US)

(73) Assignee: V & L Tool, Inc., Waukesha, WI (US)

( * ) Notice: Subject to any disclaimer, the term of this patent is extended or adjusted under 35 U.S.C. 154(b) by 0 days.

(21) Appl. No.: 10/152,153

(22) Filed: May 21, 2002

(51) Int. Cl.[7] .............................. F25C 1/18; A23G 9/00
(52) U.S. Cl. ............................................. 62/68; 62/342
(58) Field of Search ............................. 62/68, 342, 343

(56) References Cited

U.S. PATENT DOCUMENTS

| | | | |
|---|---|---|---|
| 2,608,833 A | | 9/1952 | Woodruff |
| 3,196,627 A | | 7/1965 | Swensen |
| 3,811,494 A | | 5/1974 | Menzel |
| 3,898,859 A | * | 8/1975 | Duke ........................ 62/135 |
| 4,012,185 A | | 3/1977 | Poore et al. |
| 4,018,545 A | | 4/1977 | Knedlik |
| 4,383,417 A | | 5/1983 | Martineau |
| 4,412,428 A | | 11/1983 | Giannella et al. |
| 4,463,572 A | | 8/1984 | Brown, Jr. |
| 4,580,905 A | | 4/1986 | Schwitters et al. |
| 4,606,200 A | | 8/1986 | Nielsen |
| RE32,360 E | | 2/1987 | Martineau |
| 4,659,575 A | | 4/1987 | Fiedler |
| 4,703,628 A | | 11/1987 | Togashi et al. |
| 4,732,013 A | | 3/1988 | Beck |
| 4,747,272 A | * | 5/1988 | Howell et al. ................. 62/136 |
| 4,758,097 A | | 7/1988 | Iles, Sr. |
| 4,838,702 A | | 6/1989 | Torimitsu et al. |
| 4,881,663 A | | 11/1989 | Seymour |
| 5,159,818 A | | 11/1992 | Etou et al. |
| 5,201,861 A | * | 4/1993 | Menzel ........................ 62/135 |
| 5,277,037 A | * | 1/1994 | Gram ........................ 62/306 |
| 5,349,825 A | | 9/1994 | Duke et al. |
| 5,419,150 A | * | 5/1995 | Kaiser et al. ................. 62/342 |
| 5,433,084 A | | 7/1995 | Kaiser et al. |
| 5,615,559 A | * | 4/1997 | Kress et al. ..................... 62/68 |
| 5,706,720 A | | 1/1998 | Goch et al. |
| 5,755,106 A | | 5/1998 | Ross |
| 6,101,834 A | | 8/2000 | Ross |
| 6,119,472 A | | 9/2000 | Ross |
| 6,220,047 B1 | | 4/2001 | Vogel et al. |
| 6,494,055 B1 | * | 12/2002 | Meserole et al. ............. 62/342 |

OTHER PUBLICATIONS

Emery Thompson Machine & Supply Co., Model FC–500–3 Triple Freezer, 2000, Bronx, New York.

Taylor Company, C002 Custard Freezer, Feb. 2001, Rockton, Illinois.

Carpigiani–Coldelite, Frozen Custard from Carpigiani-–Coldelite, printed from www.coldelite.com on Mar. 28, 2001.

Ross's Manufacturing, Ross's Frozen Custard Machines, printed from www.frozencustard.com on Mar. 28, 2001.

* cited by examiner

*Primary Examiner*—William E. Tapolcai
(74) *Attorney, Agent, or Firm*—Reinhart Boerner Van Deuren, s.c.

(57) ABSTRACT

A method and machine for making frozen custard or similar products includes a freezing barrel, a pump for providing liquid mix to the freezing barrel, a dasher positioned in the freezing barrel for driving product through and dispensing the product from the freezing barrel, and a refrigeration system for chilling the freezing barrel. A user interface allows an operator to select from among a plurality of production rates. A system controller automatically controls the pumping rate, dasher motor speed, and chilling level to produce a product in the freezing barrel at the desired production rate and having the desired product quality and consistency. An ultrasonic sensor may be employed to monitor a level of liquid mix in a liquid mix container. A warning signal may be provided to the operator when the level of mix in the container runs low.

22 Claims, 11 Drawing Sheets

FROZEN CUSTARD MACHINE

FIELD OF THE INVENTION

The present invention pertains generally to methods and devices for preparing and dispensing frozen confectionery foods, such as frozen custard.

BACKGROUND OF THE INVENTION

Various systems and methods have been developed for the preparation and dispensing of frozen confectionery food products, such as ice cream, milk shakes, frozen yogurt, frozen juices, frozen carbonated beverages, and, in particular, frozen custard. Machines for the preparation and dispensing of frozen custard, and similar frozen confectionery food products, typically include a liquid mix container, for storing a liquid mixture from which the final frozen or semi-frozen food product is produced, and a freezing barrel or cylinder, in which the liquid mix is frozen to a desired consistency to produce the final frozen or semi-frozen food product.

The liquid mix container and freezing barrel are connected together via a tube or some other structure for providing liquid mix from the liquid mix container to the freezing barrel. The liquid mix container may be positioned above the freezing barrel, with liquid mix fed via gravity from the liquid mix container to the freezing barrel. A valve or other metering mechanism, which may be manually or automatically operated, may be positioned between the liquid mix container and the freezing barrel to control the flow of liquid mix from the liquid mix container to the freezing barrel. Alternatively, the liquid mix container may be positioned below or in some other position with respect to the freezing barrel. In such a case, liquid mix from the liquid mix container may be pumped, e.g., using a peristaltic pump or some other pumping mechanism, from the liquid mix container into the freezing barrel. As another alternative, the liquid mix container may be pressurized to provide for the pressurized transfer of liquid mix from the liquid mix container to the freezing barrel. Liquid mix within the liquid mix container may be refrigerated to maintain the quality of the mix in the mix container before it is provided to the freezing barrel. Cooling of the liquid mix in this manner may be provided by refrigeration coils wrapped around or otherwise positioned adjacent to the liquid mix container, or by positioning the liquid mix container within a refrigerated chamber.

The freezing barrel, for freezing the liquid mix to a desired consistency, is typically cylindrical in shape. Liquid mix from the liquid mix container is typically admitted into one end of the freezing barrel, and a frozen confectionery product, e.g., frozen custard, is dispensed from the opposite end of the freezing barrel. Back and front plates, which may be removable, seal the back and front ends of the freezing barrel. Liquid mix is admitted into the freezing barrel, typically through an aperture formed in or near the back sealing plate. The frozen or semi-frozen confectionery product formed in the freezing barrel is dispensed through a dispensing aperture formed in the front sealing plate thereof. Typically, a valve or gate structure is provided for closing the dispensing aperture formed in the front sealing plate, thereby enabling an operator to control the flow of frozen or semi-frozen product therefrom.

A rotatable mixing mechanism, sometimes referred to as a dasher, is disposed within the freezing barrel, typically along a central axis thereof. The mixing mechanism typically includes a mixing mechanism shaft, which is mounted at one end thereof for rotational movement in the front sealing plate and at the other end thereof at the back sealing plate. A motor, typically an electric motor, is positioned adjacent to the back sealing plate, typically outside of the freezing barrel, and is coupled through a seal structure to the mixing mechanism shaft, thereby to rotate the shaft. Blades of various sizes and shapes may be mounted to the mixing mechanism shaft within the freezing barrel. The blades mounted to the shaft may be designed for several purposes, including the mixing of liquid mix within the freezing barrel, the scraping of frozen product from the inner peripheral surface of the freezing barrel, and the providing of an auger mechanism for moving mix from the back of the freezing barrel to the front thereof, wherefrom the final frozen or semi-frozen food product is dispensed.

The freezing barrel is chilled, typically by refrigerant evaporator coils wrapped around the freezing barrel or by a refrigerant evaporator barrel or chamber formed around the freezing barrel and through which refrigerant is pumped. The entire freezing barrel, except for the back and front ends thereof, including any evaporator coils or chamber surrounding the freezing barrel, is typically encased in a thermally insulating material, such as foam, thereby to provide more efficient chilling of the freezing barrel, and to minimize the effect of ambient environmental temperatures on the freezing barrel temperature. As liquid mix is driven by the rotating mixing mechanism from the back end to the front end of the chilled freezing barrel, the liquid mix is frozen to a desired consistency to be dispensed from the front end of the freezing barrel.

Various systems and methods have been devised for controlling the combined process of providing liquid mix to a freezing barrel, mixing the mix in and propelling the mix through the barrel, freezing the mix in the barrel as it is propelled therethrough, and dispensing a frozen product from the freezing barrel, to ensure that the final frozen food product produced by the combined process has the desired consistency and quality. For example, many frozen food products (e.g. soft serve ice cream, milk shakes, etc.) are dispensed serving by serving from the freezing barrel of the machine in which they are produced. To maintain a desired amount of mix within the freezing barrel, to provide a desired quantity and quality of product, some systems monitor operation of a dispensing mechanism provided at the front end of the freezing barrel. By monitoring when, or for how long, the dispensing mechanism is opened, or an amount of product dispensed through the dispensing mechanism, the providing of liquid mix into the freezing barrel may be controlled in response thereto to maintain a desired amount of mix in the freezing barrel. Other systems have monitored the weight of material in the freezing barrel, or the pressure within the freezing barrel, and have controlled the providing of liquid mix into the freezing barrel to maintain a desired weight or pressure of material within the barrel. Systems have also used thermistors or other temperature sensors to monitor temperatures within the freezing barrel, and have employed such temperature monitoring to control the refrigeration system providing chilling to the freezing barrel, thereby to maintain the freezing barrel and, therefore, the contents thereof, at a desired temperature. Still other systems have monitored the speed of rotation of the rotatable mixing mechanism positioned in the freezing barrel, or the amount of work required to drive the mixing mechanism (which may be measured by monitoring current flow to an electric motor driving the mixing mechanism), to determine the consistency of the product within the freezing barrel, and to adjust operation of the system (e.g. chilling temperature and mixing mechanism rotation) in response thereto.

Some machines for producing frozen or semi-frozen food products provide for different modes of operation of the machine. For example, the freezing barrel temperature and/or speed of mixing mechanism rotation may be controlled automatically by the machine to different temperature levels and speeds depending upon whether the machine is in, e.g., a production mode, where a frozen food product is being produced by the machine, a hold mode, where a frozen or semi-frozen product within the freezing barrel is maintained at a desired consistency without more product being made, a cleaning mode, where water or some other cleaner is passed through the freezing barrel to clean and sterilize it, or a pasteurization mode, where a liquid mix is actually heated in the freezing barrel to a desired temperature. An operator may typically select the desired mode of operation, e.g., using a user input device provided on the machine.

Frozen custard is typically produced as a continuous process by a frozen custard machine. Rather than providing for the dispensing of individual servings, frozen custard is typically produced by a frozen custard machine at a continuous production rate. Thus, during the production of frozen custard, there is a continuous flow of liquid mix into the freezing barrel of the frozen custard machine, and a corresponding flow of frozen custard out of the freezing barrel. The frozen custard typically flows from the freezing barrel of the frozen custard machine out of a dispensing aperture formed in the front of the freezing barrel and down a chute into a chilled dipping cabinet. Servings of frozen custard are hand-dipped from the frozen custard that is stored temporarily in the dipping cabinet. In such a system, a degree of refrigeration provided to the freezing barrel is set so as to freeze the frozen custard mix passing through the freezing barrel to a desired consistency for a pre-set production rate.

Frozen custard, like many other frozen confections, is best, i.e., has the best taste, texture, and appearance, when served soon after it is produced, e.g., by a frozen custard machine. Thus, frozen custard should not be stored for a long period of time in the dipping cabinet before being served. (The egg yolks which are one ingredient of frozen custard may cause the frozen custard to discolor if not served promptly after it is produced by the frozen custard machine.) This can pose a problem when trying to pre-determine the appropriate production rate for a frozen custard machine. The frozen custard machine production rate must be sufficient to provide an adequate supply of fresh frozen custard during times of high demand. Failure to produce custard at a sufficient rate during times of high customer demand could result in missed sales. During periods where there is no customer demand, production of frozen custard by the frozen custard machine can be stopped entirely. For example, the frozen custard machine may be put in a hold mode, wherein the flow of custard through the freezing barrel is suspended, and wherein refrigeration of the freezing barrel is maintained at a level to keep the custard currently in the freezing barrel at a desired temperature level in anticipation of the resumption of production. During periods of intermediate customer demand, however, production of custard by the custard machine at a pre-set level to meet maximum customer demand will out-strip the current demand. This could result in wasted product. If the excess product produced during periods of lesser demand is saved for too long, for example, in a dipping cabinet, the quality thereof will degrade to a point where it should not be served to customers. Not producing any product during periods of lower demand could result in missed sales.

Therefore, what is desired is a method and machine for producing frozen custard, and similar frozen confections, which provides for the production of fresh frozen product of a desired consistency and quality at production rates which may be adjusted in response to current customer demand. The desired machine for producing frozen custard, or another similar frozen confection, should automatically adjust all operating parameters thereof so as to produce a frozen confectionery product of a desired quality and consistency at whichever production rate is selected by an operator of the machine.

SUMMARY OF THE INVENTION

The present invention provides a method and a machine for producing frozen custard or other frozen or semi-frozen confectionery products at a plurality of operator selectable production rates such that a rate of continuous production of the frozen product may be selected to correspond to customer demand at any given time. Thus, frozen custard, or a similar product, produced by a method or machine in accordance with the present invention, may be served fresh to customers, with sufficient production guaranteed to meet varying customer demand, and with a minimum of wasted product. A frozen custard or other machine in accordance with the present invention is easily controlled by an operator to select a production rate at a desired level. Based on the desired production rate selected by the operator, a frozen custard- or other machine in accordance with the present invention automatically adjusts various operating parameters of the machine to provide frozen custard or another similar product of a desired and consistent quality and consistency, regardless of the production rate selected. In accordance with the present invention, an operator is preferably also able to make manual adjustments in selected operating parameters, to fine tune product quality and consistency at each selected production level.

The present invention may preferably be implemented in a frozen custard or similar machine including one or more freezing barrels mounted in a machine cabinet. A plurality of freezing barrels may be provided in a single cabinet to provide a frozen custard machine in accordance with the present invention which is capable of producing several differently flavored frozen custards at the same time (one flavor in each barrel). Liquid mix for each freezing barrel is preferably stored in a liquid mix hopper container. The liquid mix hoppers are preferably stored in a refrigerated compartment, which may be positioned below the freezing barrels in the machine cabinet, and which is easily accessible through a door in the machine cabinet. The liquid mix hoppers are preferably easily removable from the refrigerated compartment for refilling and cleaning. Containing the liquid mix in the hoppers in a refrigerated compartment ensures that the mix remains fresh and pre-chilled to a desired temperature before being provided to a freezing barrel.

Liquid mix preferably is provided from a liquid mix hopper container to a corresponding freezing barrel via a flexible tube extending from the hopper to a coupling structure in fluid communication with a filling aperture formed through a back sealing plate of the freezing barrel. A peristaltic pump is preferably employed to pump liquid mix through the flexible tube from the hopper to the freezing barrel in a sanitary manner.

A rotatable mixing mechanism or dasher, which includes a dasher shaft, to which dasher blades are mounted, is positioned axially within the freezing barrel. One end of the dasher shaft is mounted for rotational movement in a front sealing plate of the freezing barrel. The other end of the dasher shaft is coupled through a seal in a back sealing plate of the freezing barrel to an electric dasher motor for rotation of the dasher in the freezing barrel. Rotation of the dasher mixes the mix within the freezing barrel to ensure uniform freezing thereof and propels the frozen custard mix through the freezing barrel to be dispensed in final frozen form through a dispensing aperture formed in the front sealing plate thereof. A cut-off gate may be provided at the dispensing aperture of the freezing barrel to close the dispensing aperture during periods when frozen custard is not in production. Frozen custard dispensed through the dispensing aperture formed in the front sealing plate may be directed via a chute into a refrigerated dipping cabinet, from which the frozen product is scooped into cones or bowls for distribution to customers.

Chilling of the liquid mix in the freezing barrel to a frozen state is provided by circulating refrigerant around an outer surface of the freezing barrel. An evaporator chamber preferably is formed around the outer elongated surface of the freezing barrel, through which the refrigerant is pumped. The elongated outer surface of the freezing barrel, including the refrigerant evaporator chamber surrounding the freezing barrel, preferably is encased in a thermally insulating material (such as foam) to ensure efficiency in chilling of the freezing cylinder and to minimize the impact of ambient environmental temperature conditions on operation of the system and product quality/consistency.

A frozen custard or other machine in accordance with the present invention preferably includes a user interface which allows an operator to select a rate of production of the machine. For example, an operator preferably is able to employ the user interface to select from among at least two production rates, such as a high production rate, to meet high current customer demand, or a low production rate, to meet a lesser level of current customer demand. Whichever rate of production, high or low, is selected, the quality and consistency of the frozen product produced by the machine should be the same. In accordance with the present invention, in response to the selection of a production rate by an operator using the operator interface, a system controller automatically adjusts operating parameters of the frozen custard machine to ensure production of a frozen or semi-frozen food product having the desired qualities at the selected production rate.

In accordance with the present invention, three operating parameters preferably are adjusted automatically by a system controller in response to the desired production rate selected. These three parameters are: the rate at which liquid mix is provided to the freezing barrel, the speed at which the dasher is rotated to propel mix through the freezing barrel, and the freezing temperature of the freezing barrel. For lower production rates, the rate at which liquid mix is provided to the freezing barrel is reduced and the speed of rotation of the dasher shaft is reduced correspondingly to reduce the rate at which the product is propelled through and dispensed from the freezing barrel. Conversely, for higher production rates, the rate at which liquid mix is provided to the freezing barrel is increased, and the dasher shaft rotation speed is increased to propel product through and out of the freezing barrel at an increased rate. The rate at which liquid mix is provided to the freezing barrel may be adjusted by adjusting the pumping rate, e.g., of the peristaltic pump, which is used to pump the liquid mix from a liquid mix hopper container to the freezing barrel. Similarly, dasher shaft rotation speed may be adjusted by adjusting the speed of operation of the dasher motor employed to drive the dasher shaft.

In accordance with the present invention, the freezing temperature of the freezing barrel preferably is also adjusted in accordance with the selected production rate to ensure that the frozen product produced at the selected production rate has a desired and consistent consistency. At higher production rates, the freezing temperature of the freezing barrel is reduced to ensure that the liquid mix is thoroughly frozen to a desired consistency by the time it reaches the dispensing aperture at the front end of the freezing barrel. Conversely, at lower production rates, the freezing temperature of the freezing barrel must be increased. If a too low freezing temperature is employed during a lower production rate, the mix in the freezing barrel may freeze up solid, thereby stopping production entirely.

In accordance with the present invention, the freezing barrel temperature preferably is adjusted in accordance with the selected production rate by the system controller by controlling the refrigeration system which provides refrigerant to the refrigerant evaporator chamber surrounding the freezing barrel. Preferably, the freezing barrel temperature may be controlled by controlling the pressure of refrigerant provided to the refrigerant evaporator chamber surrounding the freezing barrel. For higher production levels, refrigerant of a lower pressure level is provided to the refrigerant evaporator chamber. The lower pressure refrigerant results in more rapid removal of heat from the freezing barrel and its contents. For lower production levels, refrigerant is provided to the refrigerant evaporator chamber surrounding the freezing barrel at a higher refrigerant pressure level. This results in less rapid heat removal from the freezing barrel and its contents.

Adjustment of the pressure level of the refrigerant provided to the evaporator chamber surrounding the freezing barrel may be accomplished by providing pressurized refrigerant to the evaporator chamber via one selected path of a plurality of refrigerant paths operating at different pressure levels. For example, for a frozen custard or other machine in accordance with the present invention which may be operated at either a high production rate or a low production rate, refrigerant lines may be provided for providing pressurized refrigerant from a source of pressurized refrigerant (e.g., a remote condensing unit) to the refrigerant evaporator chamber surrounding the freezing barrel via either a lower pressure refrigerant path (for high production rates) or a higher pressure refrigerant path (for lower production rates). The pressure of the refrigerant in the evaporator chamber may be controlled with an automatic expansion valve (e.g., 20–24 PSIG) in the low pressure refrigerant path. An evaporator pressure regulator (EPR) valve may be employed to control pressure of the refrigerant provided to the evaporator chamber in the higher pressure refrigerant path (e.g., 36–40 PSIG). A solenoid operated valve, operated by the system controller in response to the production mode selected, may be used to direct refrigerant to the freezing barrel through either the lower pressure or higher pressure refrigerant path. Thus, by controlling the pumping rate of the pump providing liquid mix to the freezing barrel, the speed of operation of the dasher motor driving the dasher shaft, and the valve directing the path of refrigerant provided to the evaporator chamber surrounding the freezing barrel, a system controller of a frozen custard or other machine in accordance with the present invention automatically adjusts all of the machine operating parameters necessary to produce frozen custard or another similar frozen food product at an operator selected variable production rate while maintain desirable product qualities.

The user interface of a frozen custard or other machine in accordance with the present invention preferably allows an operator of the machine to select the desired production rate as well as to monitor operating conditions of the machine at the selected production rate and to adjust manually certain operating parameters of the machine in response to such monitored conditions. For example, a frozen custard or other machine in accordance with the present invention may include a thermister or other temperature sensing device mounted in or near the freezing barrel for monitoring the temperature of the frozen product produced therein. Such a temperature sensor preferably may be provided at the dispensing aperture of the freezing barrel, thereby providing for monitoring of the temperature of the final frozen product as dispensed through the aperture. Temperature information provided by the temperature sensor may be provided to the user interface and displayed thereon.

Using such product temperature information, along with the operator's own observation of the product being dispensed from the machine, the operator may determine that a slight adjustment in one or more of the machine operating parameters is required to maximize the quality and/or consistency of the product being dispensed by the machine. Thus, although the operating parameters (rate at which liquid mix is provided to the freezing barrel, dasher speed, and freezing barrel temperature) may be established automatically by the machine in response to the selection of a desired production rate, the machine preferably allows the operator to make slight adjustments to one or more of those parameters to fine tune production if required or desired. For example, a frozen custard or other machine in accordance with the present invention may automatically select a first delivery rate of liquid mix from a liquid mix container to the freezing barrel in response to a user selecting a high production rate and a second delivery rate of liquid mix from the liquid mix container to the freezing barrel in response to the operator selecting a lower production rate. In accordance with the present invention, the user interface preferably allows the operator to adjust the delivery rate of the liquid mix from the liquid mix container to the freezing barrel over a limited range of delivery rates around the first delivery rate or the second delivery rate, thereby to make slight adjustments in the delivery rate from the automatically set first or second delivery rate. Similarly, a frozen custard or other machine in accordance with the present invention may automatically set a first dasher speed in response to an operator selecting a high production rate and a second dasher speed in response to an operator selecting a lower production rate. In accordance with the present invention, the machine user interface preferably allows the operator to adjust the dasher speed for a limited range of dasher speeds around the automatically set first or second dasher speed. This ability manually to adjust selected operating parameters, such as the delivery rate of liquid mix from the liquid mix container to the freezing barrel and the dasher speed, for a limited range of values around automatically set values of those parameters, allows an operator to fine tune operation of the machine to optimize the quality of the frozen food product produced by the machine.

The user interface also preferably may provide other information related to operation of the frozen custard or other machine to the operator. For example, the user interface preferably provides a warning indication to the operator when the level of liquid mix in a liquid mix hopper container runs low. Preferably, a device is employed for monitoring a level of liquid mix in the liquid mix hopper which accurately measures the liquid mix level in the container while requiring low maintenance. In accordance with the present invention, an ultrasonic sensor may be employed to monitor a level of liquid mix in a liquid mix hopper. For example, an ultrasonic sensor may be mounted on the refrigerated compartment in which the liquid mix hopper is positioned. The ultrasonic sensor may be positioned in a fixed position on the refrigerated compartment so as to direct an ultrasonic signal downward toward the surface of the liquid mix in a liquid mix hopper positioned within the compartment below the sensor, and to detect the rebounded ultrasonic signal from the liquid mix surface. The ultrasonic sensor thus is capable of detecting a level of liquid mix in the liquid mix hopper without physically contacting the liquid mix. Unlike other conventionally employed fluid level measuring devices, such as a float mechanism, the ultrasonic sensor does not need to be cleaned periodically and risk of contamination of the liquid mix is reduced. The ultrasonic sensor may provide a signal related to the detected level of liquid mix to the system controller. The system controller monitors the liquid mix level signal, and provides preferably an audible and visible warning indication to the operator when the level of liquid mix in the liquid mix hopper is low, indicating, therefore, that additional liquid mix should be added to the liquid mix hopper.

Besides allowing for the selection of a desired production rate, the user interface of a frozen custard or other machine in accordance with the present invention preferably also allows an operator to select other operating modes of the machine. Such other operating modes may include a cleaning mode, during which water and/or a cleaning solution is directed through the freezing cylinder, and a hold mode, in which production of new frozen product by the machine is stopped, but frozen product in the freezing barrel is maintained at a desired temperature in anticipation of resumed production at any time. In accordance with the present invention, the system controller automatically controls operating parameters, e.g., liquid mix pump speed, dasher speed, and freezing barrel temperature, as required for implementation of the operating mode selected.

Further objects, features, and advantages of the invention will be apparent from the following detailed description taken in conjunction with the accompanying drawings.

DETAILED DESCRIPTION OF THE INVENTION

Figure 1:
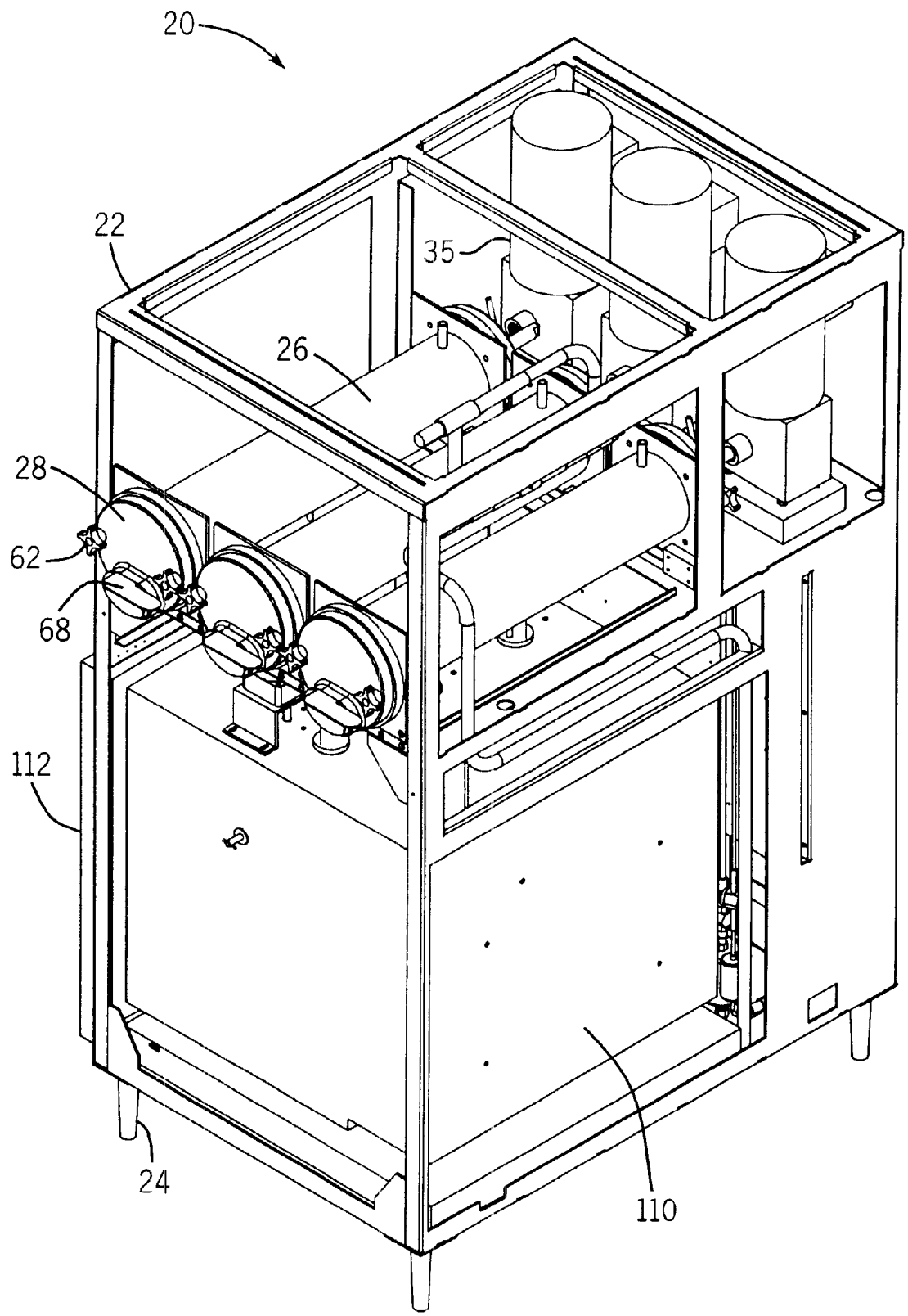
FIG. 1 is a front perspective view of an exemplary frozen custard machine in accordance with the present invention having three freezing barrels mounted in a single machine cabinet with panels of the machine cabinet removed to show the internal components of the machine.
Figure 2:
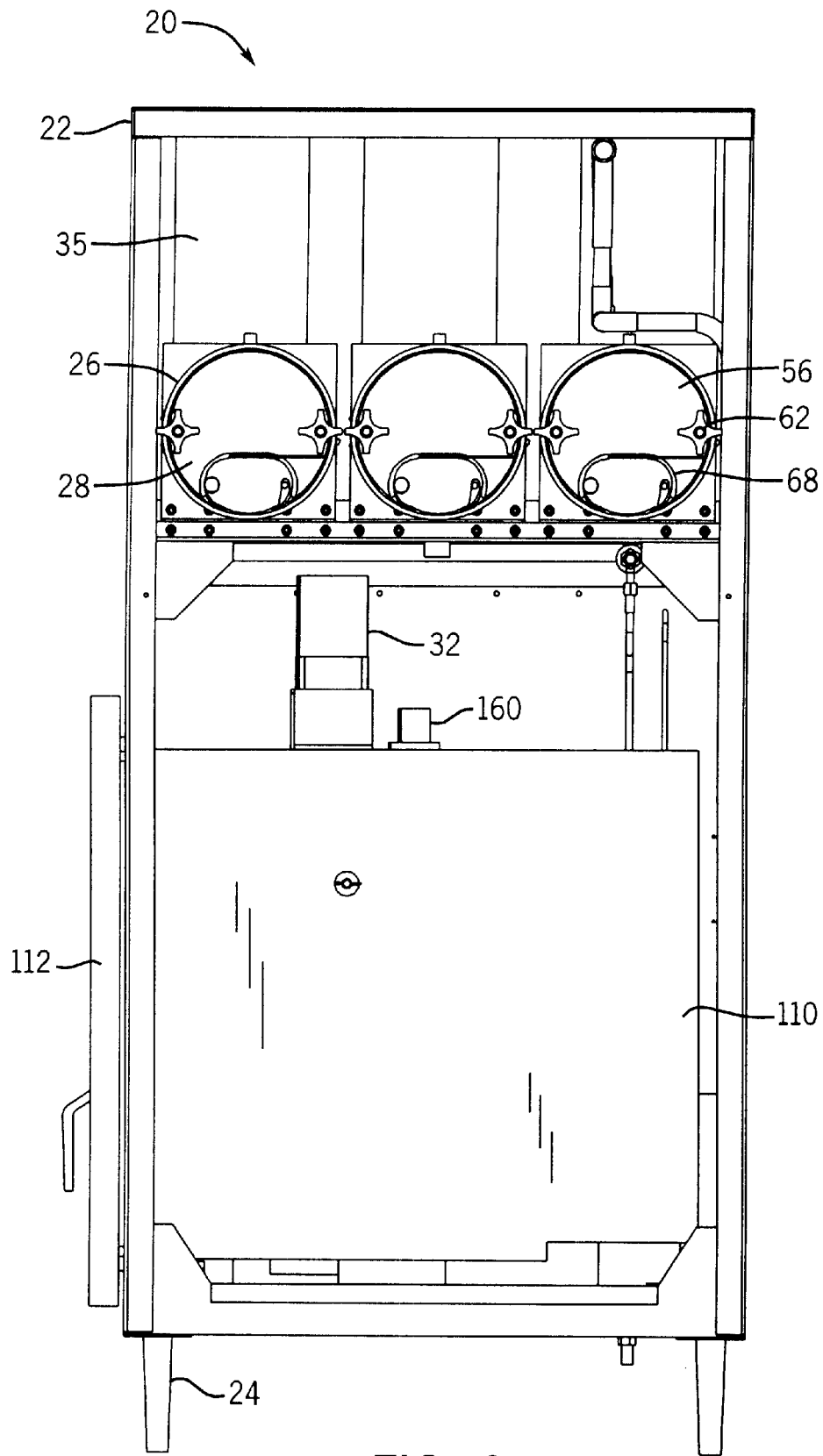
FIG. 2 is a front view of the exemplary frozen custard machine of FIG. 1
Figure 3:
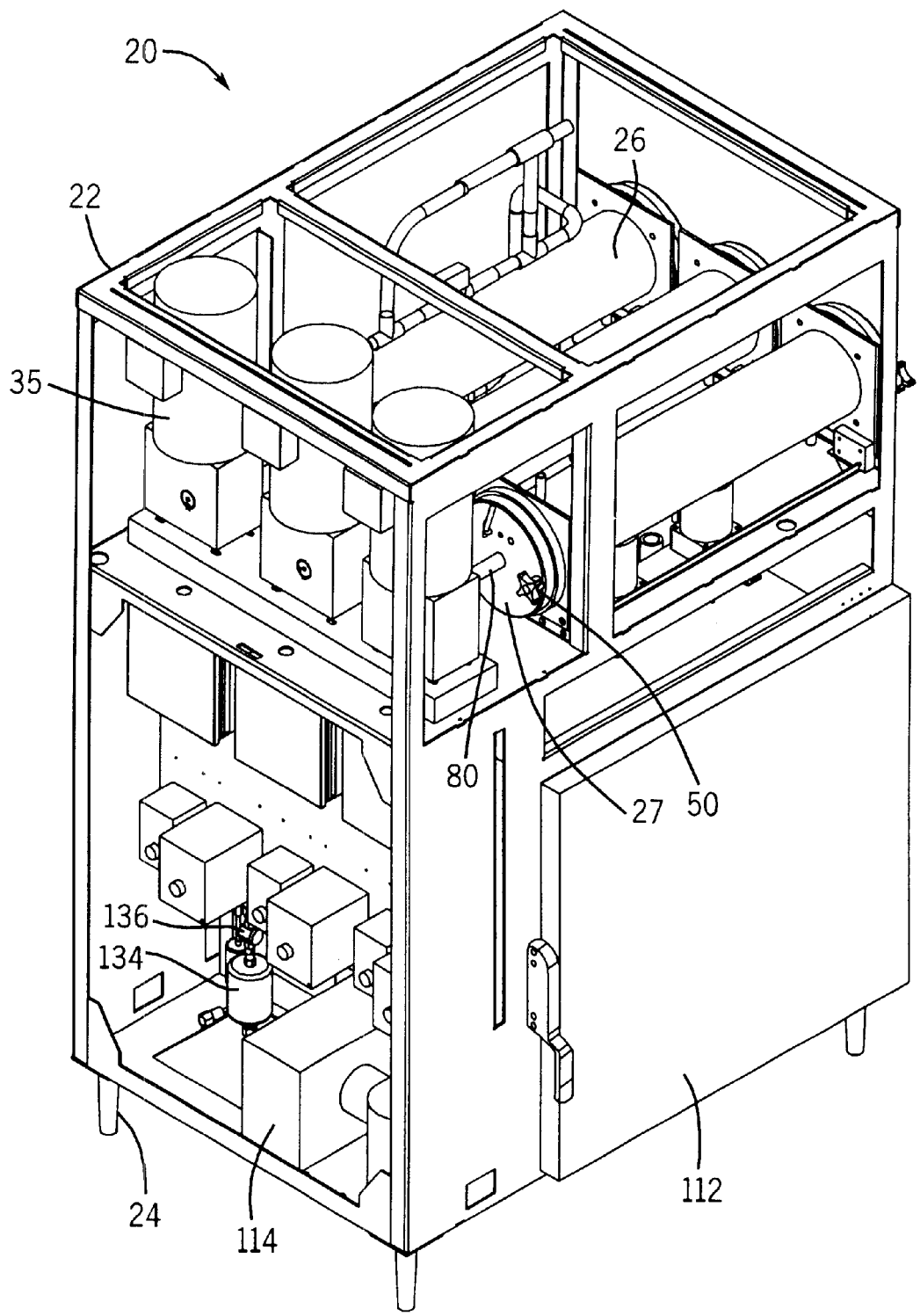
FIG. 3 is a rear perspective view of the exemplary frozen custard machine of FIG. 1.

The present invention provides a method and a machine for making a frozen confection product in which an operator is able to select a desired product production rate and in which operation of the machine is automatically controlled to produce a product having the desired qualities at the selected production rate. A machine in accordance with the present invention also provides for monitoring of machine operation and manual adjustment of operating parameters by an operator to optimize the qualities of the product being produced. The present invention will be described in detail herein with reference to the exemplary application thereof in a frozen custard machine. However, it should be understood that the present invention may be applicable to machines and methods for the production of other similar frozen or semi-frozen food products as well.

An exemplary frozen custard machine in accordance with the present invention is illustrated at 20 in FIGS. 1–4. The components which form the frozen custard machine 20 are preferably mounted and contained within a machine cabinet 22. The machine cabinet 22 preferably is formed of an internal frame structure, made of a strong and sturdy structural material, such as steel. The component which form the frozen custard machine 20 are mounted to the frame structure. The frame structure preferably is covered by external panels, which, under normal conditions, conceal the internal components of the machine 20. The panels forming the outer surface of the machine cabinet 22 may preferably be made of an easily cleaned and sanitary material, such as stainless steel. The entire cabinet 22 is preferably supported on legs 24, or another structure, which elevates the machine 20 above the floor to allow for easy cleaning under the machine 20. The machine cabinet 22 may be supported on wheels, to provide for easy movement of the machine 20.

Frozen custard is produced within a freezing barrel 26 mounted within the cabinet 22. One or more freezing barrels 26 may be mounted within a single machine cabinet 22. Multiple, independently operable, freezing barrels 26 within a single machine cabinet 22 allow, for example, a single machine 20 to be used to produce differently flavored frozen custard simultaneously (i.e., a different custard flavor in each barrel). The operation of a single exemplary freezing barrel 26 to produce frozen custard in accordance with the present invention will be described in detail herein. The other freezing barrels 26 within the machine cabinet 22 may be operated in the same way to produce frozen custard of variously different (or the same) flavors.

The freezing barrel 26 may be formed, e.g., as a stainless steel cylinder which is mounted within the machine cabinet 22. Back and front ends of the cylindrical freezing barrel 26 are closed by back 27 and front 28 sealing plate assemblies, respectively. The back 27 and front 28 sealing plate assemblies are adapted to be removably attached to the freezing cylinder 26, thereby allowing the back 27 and front 28 sealing plates to be removed to allow thorough cleaning of the interior of the freezing cylinder 26.

Frozen custard is produced in the freezing barrel 26 from liquid frozen custard mix provided to the freezing barrel 26 from a liquid mix hopper container 31. Liquid mix may be pumped from the hopper container 31 to the freezing barrel 26 by a liquid mix pump 32. Mix is propelled through the freezing barrel 26 by a rotatable mixing mechanism or dasher 34 disposed therein. The dasher 34 is coupled to and driven by a dasher motor 35. Chilling of the freezing barrel 26 is provided by a barrel freezing system 36. In accordance with the present invention, an operator may select a rate of frozen custard production by the machine 20 using an operator interface 37. The operator interface 37 is coupled to a system controller 38, which, preferably controls automatically operation of the liquid mix pump 32, the dasher motor 35, and the barrel freezing system 36, to produce frozen custard of the desired quality and consistency in the freezing barrel 26 at the production rate selected by the operator. Exemplary embodiments of each of the components mentioned thus far will now be described in greater detail.

Figure 5:
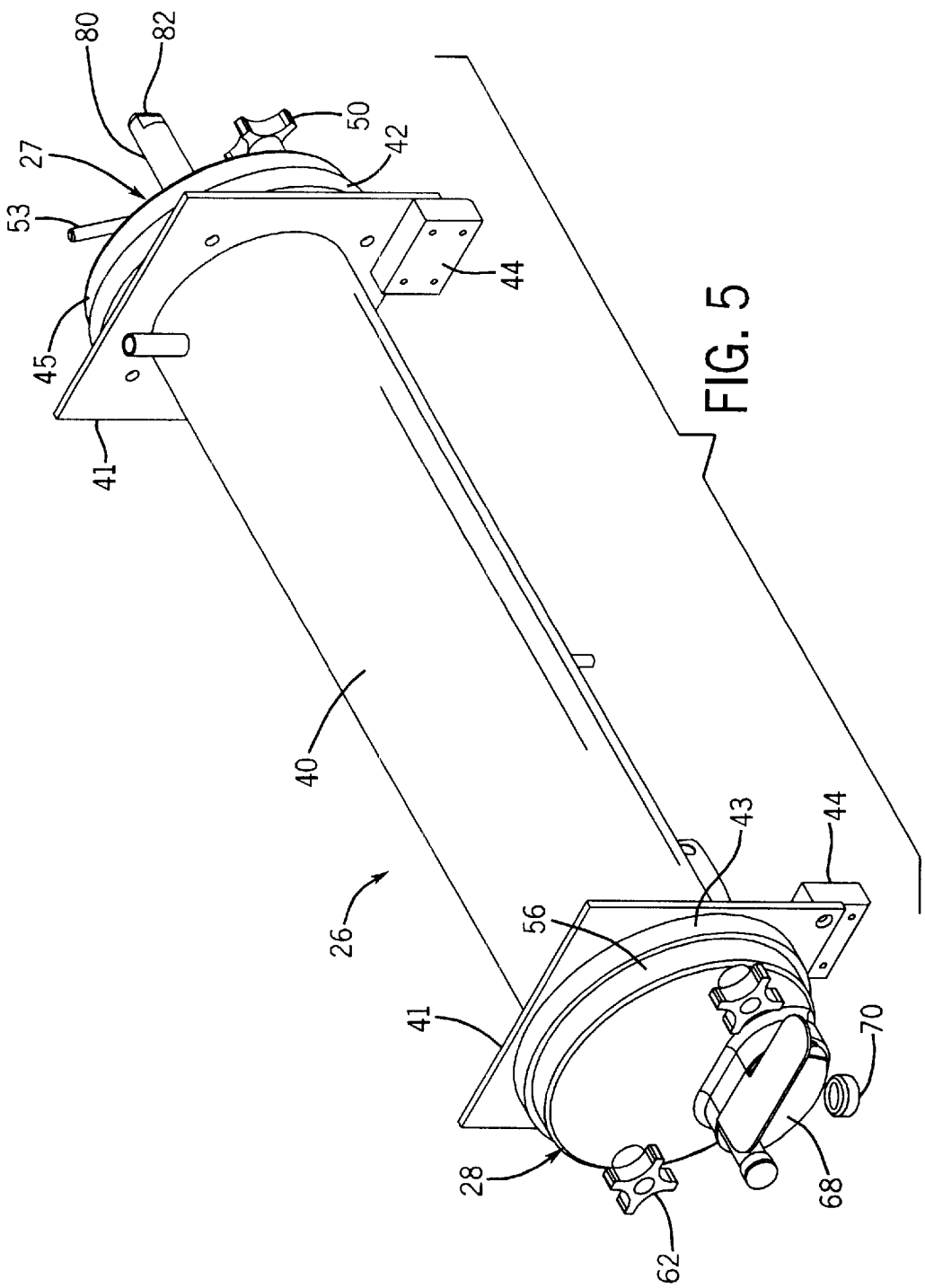
FIG. 5 is a perspective view of an exemplary freezing barrel of a frozen custard machine in accordance with the present invention.
Figure 6:
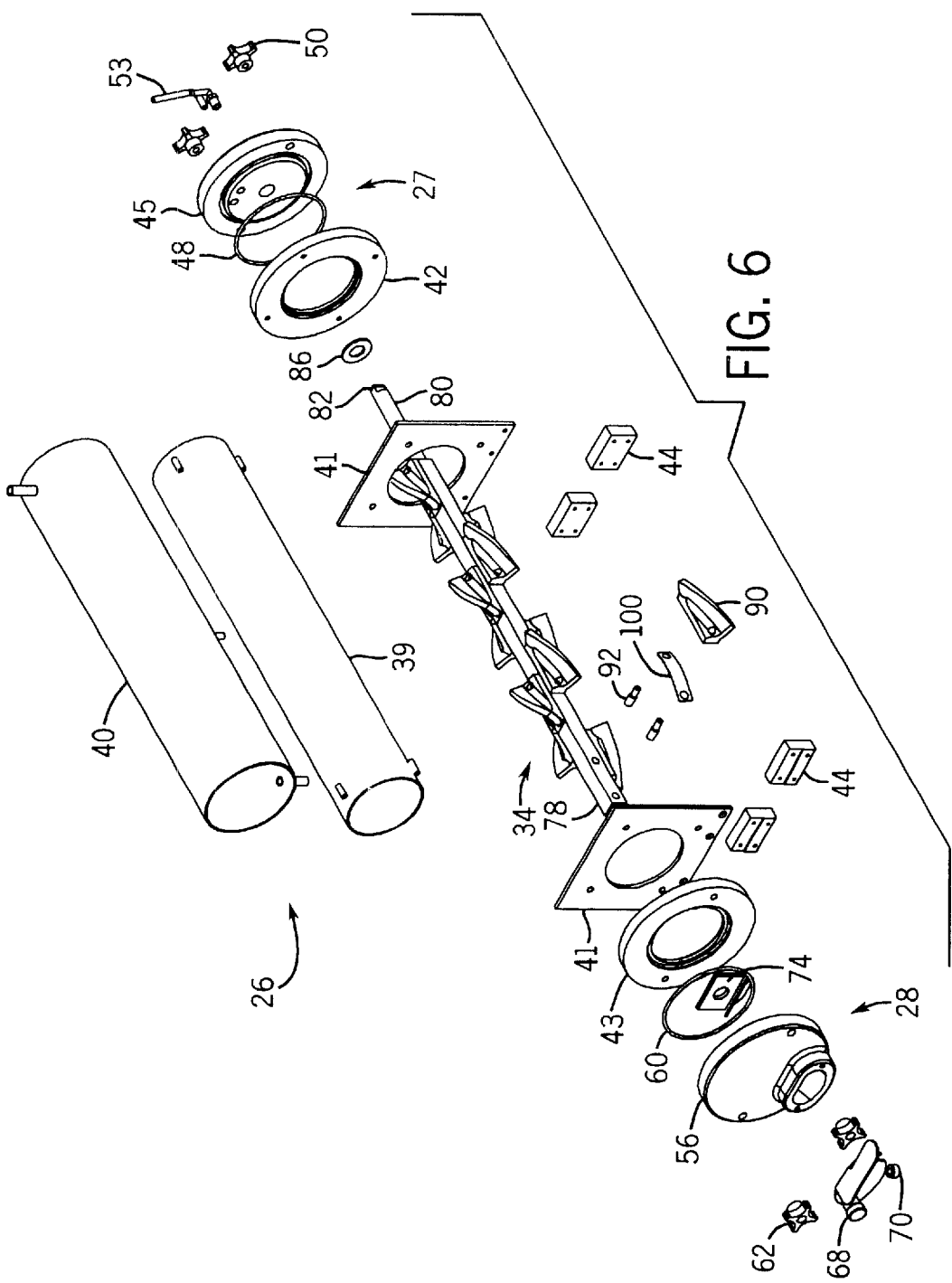
FIG. 6 is an exploded perspective view of the exemplary freezing barrel of FIG. 5 showing the internal components thereof.

The components of an exemplary freezing barrel 26 are illustrated in FIGS. 5 and 6. The body of the freezing barrel 26 is preferably formed of a sanitary material, such as stainless steel. The cylindrical body portion of the freezing barrel may be formed of two stainless cylinders, an inner cylinder 39 and an outer cylinder 40. The inner cylinder 39 is sized so as to be positioned coaxially within the outer cylinder to form a space or chamber between the outer surface of the inner cylinder 39 and the inner surface of the outer cylinder 40. As will be described in more detail below, the chamber formed between the cylinders 39 and 40 forms a refrigerant evaporator chamber through which refrigerant is passed to chill the freezing barrel 26 to a desired temperature. The two cylinders 39 and 40 may be joined together coaxially to form the chamber between them by welding the ends of the cylinders 39 and 40 to end plates 41. Central apertures in the end plates 41 are aligned with the passage through the interior of the inner cylinder 39, in which frozen custard is produced as will be described in more detail below.

As discussed above, the ends of the freezing barrel 26 are closed by back 27 and front 28 sealing plate assemblies. Back 42 and front 43 mounting plates or rings may be attached to the end plates 41, e.g., by bolting the mounting plates 42 and 43 to the end plates 41, to provide for the mounting of the back 27 and front 28 sealing plate assemblies, respectively, to the freezing barrel 26 in the manner to be described in more detail below.

The freezing barrel 26 preferably may be mounted to the frame of the frozen custard or other machine cabinet 22 by the use of mounting blocks 44 positioned between and attached to the freezing barrel end plates 41 and the cabinet frame. The mounting blocks 44 preferably are made of a thermally insulating, as well as structurally sound, material, such as Delrin. The use of thermally insulating mounting blocks 44 helps to prevent the transfer of heat from the cabinet frame to the interior of the freezing barrel 26, thereby improving chilling efficiency and product consistency.

Figure 7:
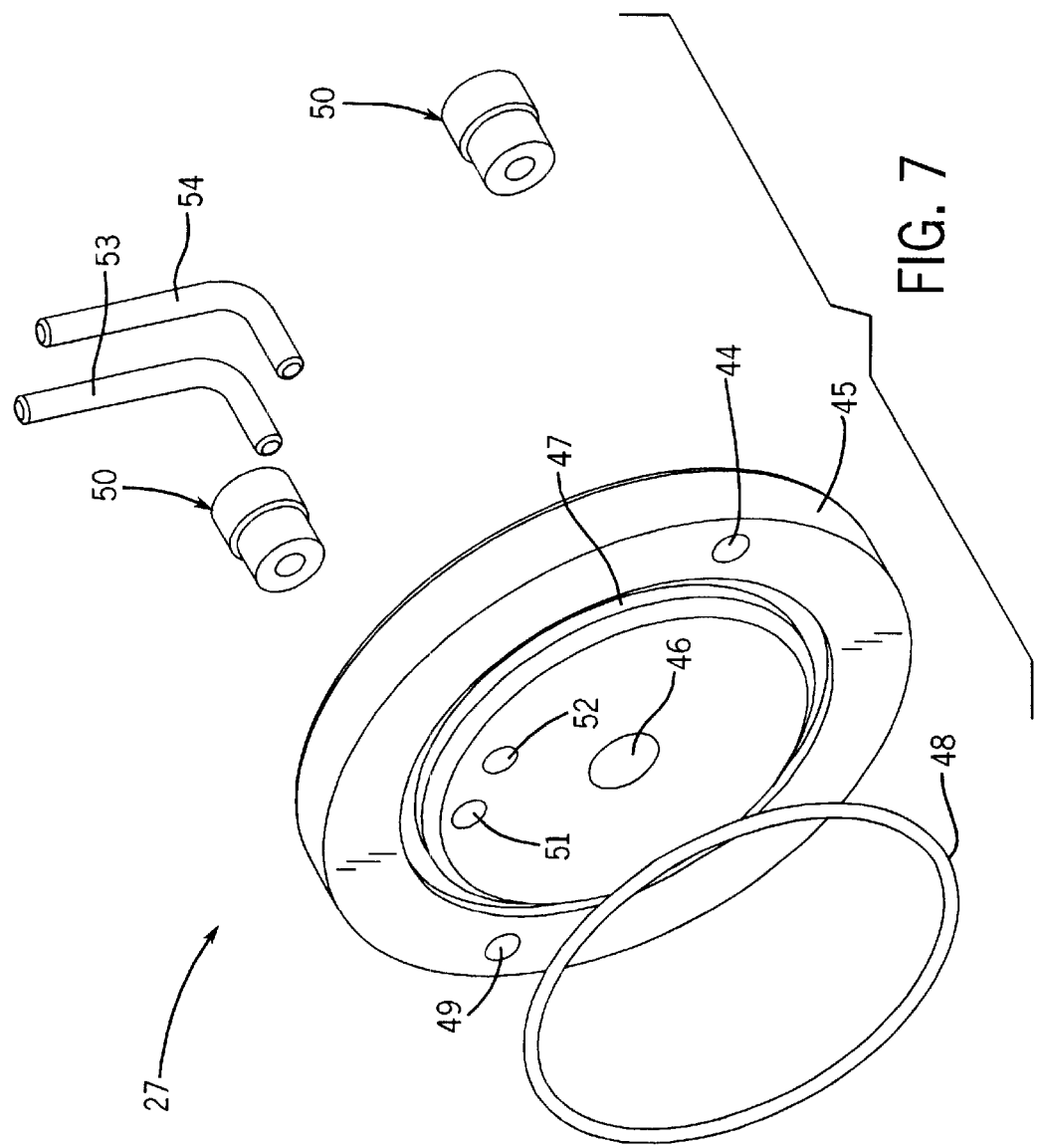
FIG. 7 is an exploded perspective view of a back plate sealing assembly for a freezing barrel of a frozen custard machine in accordance with the present invention.

Exemplary components of a back plate assembly 27 for sealing the back end of the freezing barrel 26 are illustrated in FIG. 7. The back plate assembly 27 includes a back plate 45 itself, which may be a circular disk shaped plate made of a material such as Delrin. The back plate 45 includes a central aperture 46 formed therein for supporting one end of a dasher shaft, as will be described in more detail below. An O-ring groove 47 is formed in a surface of the back plate 45 and positioned around and outward from the central aperture 46 in the back plate 45. The O-ring groove 47 is adapted to hold therein an O-ring 48, which may be made in a conventional manner of a compressible material. A plurality of mounting holes 49 are formed extending through the back plate 45 and are positioned thereon radially outward from the O-ring groove 47. The mounting holes 49 are positioned on the back plate 45 such that the back plate 45 may be attached to the back mounting plate or ring 42 of the freezing barrel 26 by extending threaded posts, formed on or attached to the back mounting plate or ring 42 and extending rearward therefrom, through the mounting holes 49. The O-ring groove 47 is positioned on the back plate 45 such that, with the O-ring 48 positioned in the groove 47, and the back plate 45 mounted by the mounting holes 49 on the back mounting plate or ring 42, with the O-ring 48 facing the mounting plate or ring 42, the O-ring 48 is compressed against the back mounting plate or ring 42, thereby forming a seal between the back plate 45 and the mounting plate or ring 42 around the open back end of the freezing barrel cylinder 26. Hand turnable knobs 50 may be threaded onto the threaded posts extending from the back mounting plate or ring 42 of the freezing barrel 26 through the back plate mounting holes 49, thereby to mount securely the back plate 45 onto the mounting plate or ring 42 and compress the O-ring 48 positioned in the O-ring groove 47 against the back mounting plate or ring 42 to form the seal between the back plate 45 and the back mounting plate or ring 42.

At least one access aperture 51 and 52 may be formed extending through the back plate 45. The access apertures 51 and 52 are formed through the back plate 45 in positions thereon between the central aperture 46 and the O-ring groove 47. Thus, when the back plate 45 is mounted to the back end of the freezing barrel 26, the access apertures 51 and 52 are in fluid communication with the interior of the freezing barrel 26. A coupling device, such as a fill tube 53, may be positioned in one of the access apertures 51, on an outside of the back plate 45, i.e., on the opposite side thereof from the O-ring groove 47. As will be described in more detail below, the fill tube 53 may be coupled to a liquid mix supply tube for providing liquid mix into the interior of the freezing barrel 26 via the fill tube 53 and aperture 51. An air tube 54 may be positioned in another access aperture 52. The air tube 54 forms a coupling device for providing air into the interior of the freezing barrel 26 via the air tube 54 and other access aperture 52. An amount of air may be provided into the interior of the freezing barrel 26 via the air tube 54 and aperture 52 to be combined with the liquid mix therein to aerate the frozen custard or other product produced in the freezing barrel 26, thereby to provide a frozen end product having a desired consistency. It has been found that leaving the open end of the air tube 54 open to the air is sufficient to provide aeration for the production of frozen custard.

Figure 8:
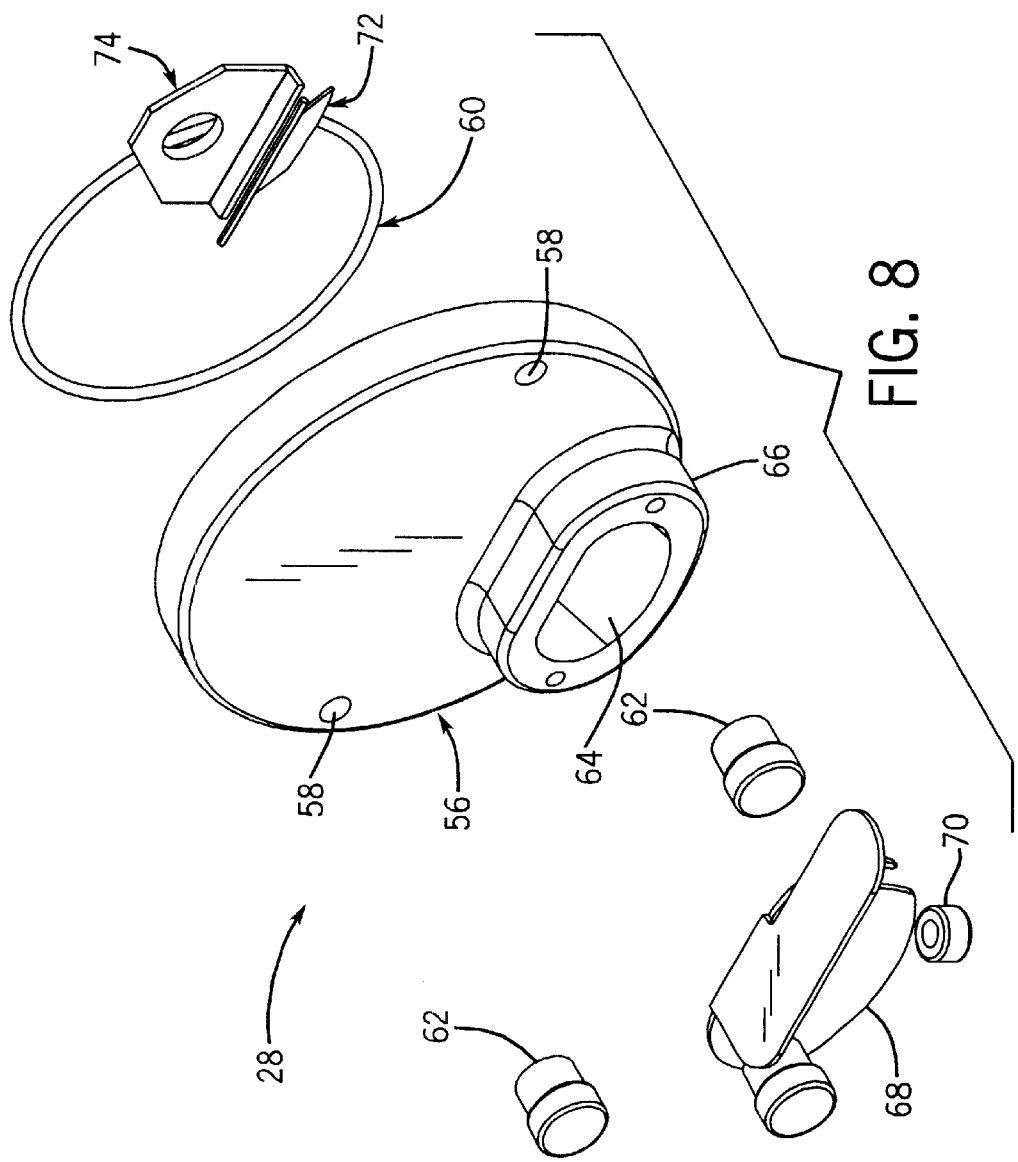
FIG. 8 is an exploded perspective view of a front plate sealing assembly for a freezing barrel of a frozen custard machine in accordance with the present invention.

The components of an exemplary front plate assembly 28 for sealing the front end of a freezing barrel 26 of a frozen custard machine 20 in accordance with the present invention are illustrated in FIG. 8. The front plate assembly 28 includes a face plate 56, which may be made of Delrin or some other similar material. The face plate 56 is sized and shaped so as to be mounted to the front mounting plate or ring 43 of the freezing barrel 26. Mounting apertures 58 are formed extending through the face plate 56 near the peripheral edge thereof. The mounting apertures are positioned on the face plate 56 such that the face plate 56 may be mounted by the mounting apertures 58 to corresponding threaded posts formed extending from the front mounting plate or ring 43. An O-ring 60, made of a conventional compressible material, may be employed to provide a seal between the face plate 56 and the front mounting plate or ring 43 of the freezing barrel 26 when the face plate is mounted to the front mounting plate or ring 43. An O-ring groove (not shown in FIG. 8) may be formed in the back or interior side of the face plate 56 (in a manner similar to the O-ring groove 47 formed in the back plate 45) to support the O-ring 60 therein. A dasher rod support aperture (not shown in FIG. 8) also may be formed on the back or interior side of the face plate 56. The dasher rod support aperture preferably does not extend entirely through the face plate 56. As will be described in more detail below, the dasher rod support aperture supports one end of a dasher rod for rotational movement therein. The face plate 56 may be mounted to the front mounting plate or ring 43 of the freezing barrel 26 by extending the threaded posts extending from the front mounting plate or ring 43 through the mounting apertures 58 formed through the face plate 56. Threaded knobs 62 may be threaded onto the ends of the threaded posts extending through the mounting apertures 58, and tightened against the front surface of the face plate 56, thereby to mount securely the face plate 56 to the mounting plate or ring 43. The O-ring 60 is sized, shaped, and positioned, such that, when the face plate 56 is mounted to the front mounting plate or ring 43, the O-ring 60 is compressed against the mounting plate or ring 43, thereby providing a good seal between the front end of the freezing barrel 26 and the face plate 56.

A dispensing aperture 64 is formed extending entirely through the face plate 56. The dispensing aperture 64 is sized and shaped so as to allow the frozen food product (e.g., frozen custard) produced in the freezing barrel 26 to be dispensed therefrom through the dispensing aperture 64. Thus, the dispensing aperture 64 is formed through the face plate 56 in a position thereon so as to be in fluid communication with the interior of the freezing barrel 26 when the face plate 56 is mounted on the front mounting plate or ring 43 of the freezing barrel 26. The dispensing aperture 64 is preferably formed near a bottom edge of the face plate 56. An extending portion 66 may be formed on the face plate 56, with a central aperture formed therein in fluid communication with the dispensing aperture 64, to direct frozen food product passing through the dispensing aperture 64 away from the face plate 56.

A structure is preferably provided for closing of the dispensing aperture 64 when production of frozen custard by the frozen custard machine 20 is halted. Although various structures may be used to close the dispensing aperture 64 from outside of the freezing barrel 26, a preferred such structure is a cut off gate assembly 68. The cut off gate assembly 68 may be mounted to the extending portion 66 of the face plate 56, in front of the dispensing aperture 64. The cut off gate 68 may be rotated upward to open the path through the dispensing aperture 64, to allow frozen custard to be dispensed therethrough when frozen custard is being produced by the machine 20. The cut off gate 68 may be rotated downward to close off the dispensing aperture 64 when frozen custard production is stopped.

As will be discussed in more detail below, the production of frozen custard by a frozen custard machine 20 in accordance with the present invention is a continuous process. Thus, while in a production mode (either high or low production), the cut off gate 68 will be open and there will be a continuous ribbon of frozen custard extending from the dispensing aperture 64. Typically, this ribbon of frozen custard is directed by a chute (not shown) or other structure from the dispensing aperture 64 into a chilled dipping cabinet (not shown) placed in front of the frozen custard machine 20. (Nut 70 may be provided to mount such a chute or other structure to the bottom of the front plate assembly 28.) Frozen custard is then hand dipped from the dipping cabinet into a bowl or cone for serving to customers. When production is stopped, the continuous ribbon of frozen custard from the dispensing aperture 64 stops moving. The cut off gate 68 may then be lowered to close the dispensing aperture 64. The cut off gate 68 is designed to cut neatly the ribbon of frozen custard extending from the dispensing aperture 64 when production is stopped. The ribbon of frozen custard cut by the cut off gate 68 will then fall down the chute into the dipping cabinet.

As a safety measure, it is desirable to prevent an operator from extending fingers or any other object through the dispensing aperture 64 into the interior of the freezing barrel 26. As will be described in more detail below, during production, the dasher 34 mounted within the interior of the freezing barrel 26 is rotated to mix the frozen custard mix therein and to drive the frozen custard from the back of the freezing barrel 26 to the front thereof to be dispensed through the dispensing aperture 64. Fingers extending through the dispensing aperture 64 into the interior of the freezing barrel 26 could be injured by the rotating dasher 34. Other objects extended through the dispensing aperture 64 into the freezing barrel 26 could damage the rotating dasher 34. Therefore, a structure is preferably provided to prevent fingers or other objects from being extended through the dispensing aperture 64 into the interior of the freezing barrel 26. For example, a finger stop 72 may be positioned within the freezing barrel 26 near the point where the dispensing aperture 64 opens up into the interior of the freezing barrel 26. Finger stop 72 may include a tab which extends in front of the opening of the dispensing aperture 64 into the interior of the freezing barrel 26. The finger stop 72 prevents fingers or other objects from being extending into the interior of the freezing barrel through the dispensing aperture 64, but allows frozen custard to move freely around the sides of the finger stop 72 and out through the dispensing aperture 64. The finger stop 72 may be mounted in the desired position in the freezing barrel 26 with respect to the dispensing aperture 64 by mounting the finger stop 72, via a finger stop washer 74 (which may be made, e.g., of Delrin) to which the finger stop 72 is attached, to the back or interior side of the face plate 56.

Figure 9:
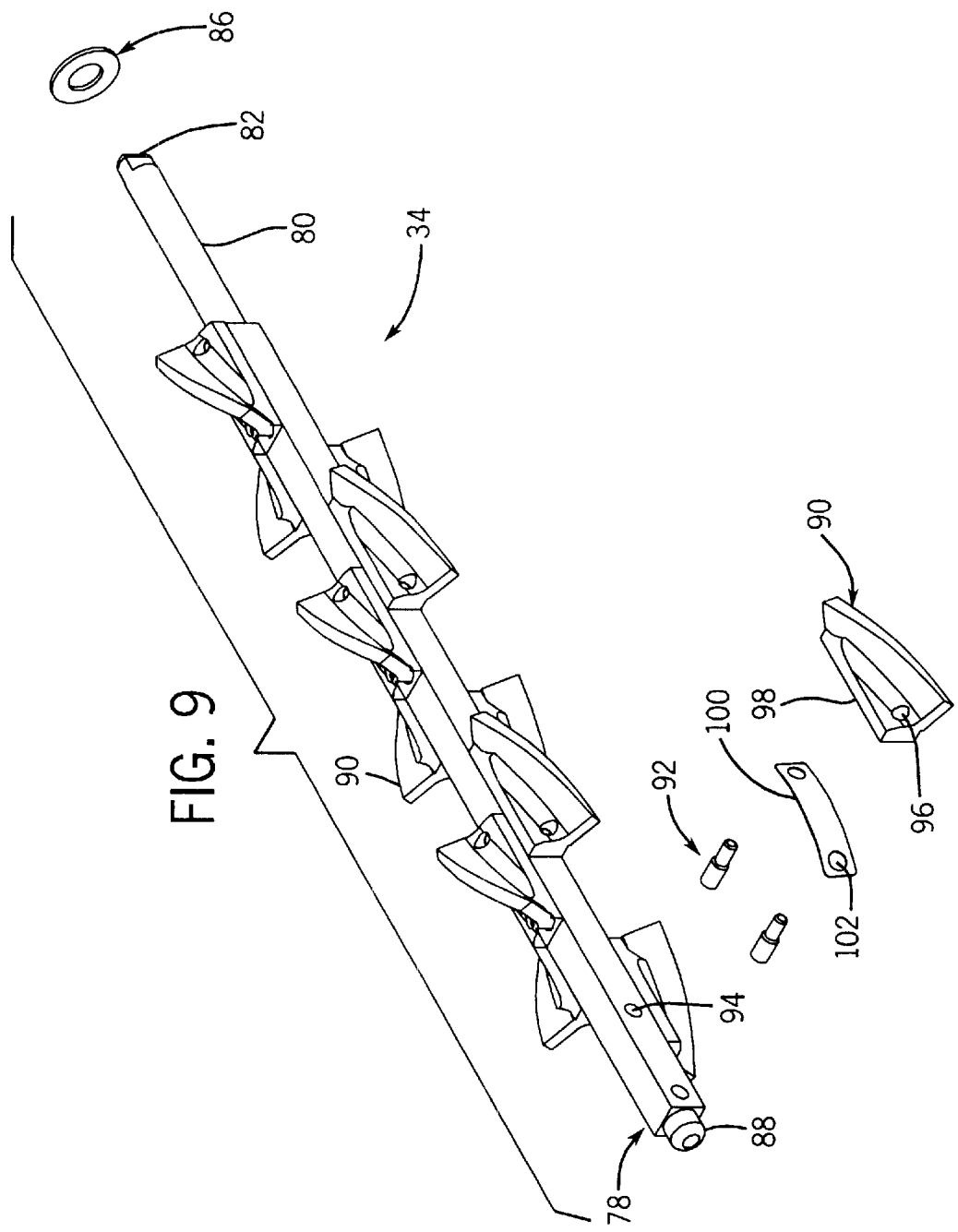
FIG. 9 is a partially exploded perspective view of a dasher shaft assembly for a freezing barrel of a frozen custard machine in accordance with the present invention.

A dasher 34 is mounted within the interior of the freezing barrel 26. The dasher 34 preferably is mounted along an axis of the interior of the freezing barrel 26. An exemplary dasher 34 which may be employed in a frozen custard machine 20 in accordance with the present invention is illustrated in FIG. 9. The dasher 34 includes a dasher shaft 78, which may be formed, for example, of a bar made of stainless steel or some other similar material. One end 80 of the dasher shaft 78 is adapted to extend through the central dasher shaft aperture 46 formed in the back sealing plate 45. A coupling structure 82 preferably may be formed at this end 80 of the dasher shaft 78, to allow this end 80 of the dasher shaft 78 to be coupled to the dasher motor 35 (see FIG. 4) for driving the dasher 34 for rotational movement thereof within the freezing barrel 26. A washer 86, made e.g., of Delrin, or some similar material, may be placed over the rear end 80 of the dasher shaft 78 to seal and reduce friction between the dasher shaft 78 and the back sealing plate 45 in which the dasher shaft 78 is mounted. A front end 88 of the dasher shaft 78 is formed so as to be mounted for rotational movement in the dasher rod support aperture formed on the back or interior side of the front sealing plate 56.

A plurality of dasher blades 90 are mounted to the dasher shaft 78 along the length thereof. The dasher blades 90 are preferably made of a low friction plastic material, such as Delrin, but may be made of other materials as well. The dasher blades 90 are sized and shaped so as to function to mix frozen custard mix within the freezing barrel, to scrape frozen custard from the inner peripheral surface of the inner freezing barrel cylinder 39, and to auger frozen custard through the freezing barrel 26 so as to be dispensed through the dispensing aperture 64 at the front end of the freezing barrel 26, as the dasher 34 is rotated within the freezing barrel 26 by the dasher motor 35.

The dasher blades 90 preferably are mounted to the dasher shaft 78 in a manner so as to prevent the blades 90 from falling off of the shaft 78 when the dasher 34 is mounted in the freezing barrel 26 while allowing some movement between the blades 90 and the shaft 78. This movement prevents the blades 90 from binding with the interior surface of the inner freezing barrel cylinder 39 as the dasher 34 is rotated therein. The dasher blades 90 also are preferably easily removable from the dasher shaft 78 for cleaning. A preferred method for mounting the dasher blades 90 to the dasher shaft 78 employs dasher shaft pins 92. The dasher shaft pins 92 may be placed in dasher shaft pin apertures 94 formed in the dasher shaft 78. The dasher shaft pins 22 may be fixedly mounted in the dasher shaft pin apertures 94. Alternatively, the dasher shaft pins 92 may be integrally formed with the dasher shaft 78 to extend therefrom. The dasher blades 90 are easily mounted on the dasher shaft pins 92 by mounting apertures 96 formed through base portions 98 of the dasher blades 90 which are placed over the dasher shaft pins 92. To allow slight movement between the dasher blades 90 and the shaft 78, the outer diameter of the shaft pins 92 is slightly smaller than the inner diameter of the blade mounting apertures 96 in which the pins 92 are placed. A spring 100, such as a conventional leaf spring, is preferably positioned between the dasher shaft 78 and each dasher blade 90. The spring 100, which may also be mounted on the dasher shaft pins 92 via mounting apertures 102 formed therein, biases the dasher blades 90 outward with a slight force against the interior surface of the inner freezing barrel cylinder 39. This insures that the dasher blades 90 are maintained in contact with the interior surface of the inner freezing barrel cylinder 39, thereby effectively to scrape frozen custard from the interior surface of the inner freezing barrel cylinder 39.

The dasher 34 may be mounted within the freezing barrel 26 by the following procedure. The back sealing plate O-ring 48 is positioned in the O-ring channel 47 formed on the back sealing plate 45. A small amount of lubricant, such as Petro-Gel, is preferably applied to the O-ring 48 before inserting it in the channel 47. The back sealing plate 45, with the O-ring 48 therein, is attached to the back mounting plate or ring 42 of the freezing barrel 26 in the manner described above. The back hand knobs 50 are tightened down evenly to secure the back sealing plate 45 to the mounting plate or ring 42. The Delrin washer 86 is placed on the dasher shaft 78. The springs 100 and dasher blades 90 are assembled via the shaft pins 92 onto the dasher shaft 78 in the manner described above as the dasher shaft 78 is extended into the freezing barrel 26 from the open front end thereof. The shaft 78 is rotated as it is extended into the freezing barrel 26, as the blades 90 and springs 100 are mounted thereon, one at a time, with a spring 100 positioned between the shaft 78 and each blade 90, making sure the springs 100 and blades 90 are mounted firmly on the shaft pins 92. With all of the blades 90 and springs 100 on the shaft 78, the dasher assembly 34 is pushed entirely into the freezing barrel 26 until the coupling structure 82 formed at the back end 80 of the shaft 78 engages the dasher motor 35. (The back end 80 of the shaft is now extending through the dasher shaft aperture 46 formed in the back sealing plate 45.) The front sealing plate O-ring 60 is then inserted in the face plate 56, with a small amount of lubricant, such as Petro-Gel. The finger stop 72 and finger stop washer 74 are inserted in the face plate 56. The face plate 56 is then mounted to the front mounting plate or ring 43 of the freezing barrel 26, in the manner described above. The front hand knobs 62 are tightened down to attach securely the face plate 56 to the mounting plate or ring 43. (The front end 88 of the dasher shaft 78 is supported for rotational movement in the dasher shaft support aperture formed on the back side of the faceplate 56.)

Returning to FIG. 4, as mentioned above, liquid mix 104, which is the liquid mixture from which frozen custard will be formed in the freezing barrel 26, is preferably stored for use in a liquid mix hopper container 31. The liquid mix hopper 31 preferably may be made of a material which is easily cleaned, such as plastic. The liquid mix hopper 31 has an open top 108, which allows liquid mix 104 to be added easily to the hopper 31 by simply pouring liquid mix into the open top 108 of the hopper 31.

The entire liquid mix hopper 31 preferably is positioned in a refrigerated compartment 110 provided within the frozen custard machine cabinet 22. The refrigerated compartment 110 preferably is sized to hold a number of liquid mix hoppers 31 corresponding to the number of freezing barrels 26 provided in the frozen custard machine cabinet 22. The walls of the refrigerated compartment 110 may be insulated in a conventional manner. Access to the liquid mix hoppers 31 in the refrigerated compartment 110 may be provided through an insulated door 112 provided in the frozen custard machine cabinet 22 (see FIGS. 1–3). The refrigerated compartment 110 may be chilled in a conventional manner by a relatively small refrigerator unit 114, also provided within the frozen custard machine cabinet 22. The refrigerator unit 114 (which may be implemented separately from the refrigeration system 36 used to chill the freezing barrel 26) preferably is controlled to maintain a temperature within the refrigerated compartment 110 which is above the freezing level of the liquid mix 104, but which is sufficiently cool to keep the liquid mix 104 in the liquid mix hoppers 31 within the refrigerated compartment 110 fresh and ready for transfer to the freezing barrel 26 to be transformed to frozen custard therein.

Liquid mix 104 preferably is transferred from the liquid mix hopper 31 to the back end of the freezing barrel 26 via a flexible tube 116, made, e.g., of plastic or some other sanitary and easily cleanable material. A rigid stainless steel tube 118 may be coupled to a distal end of the flexible tube 116 and extended down into the liquid mix 104 within the liquid mix hopper 31. The stainless steel tube 118 is sufficiently long such that the outer surface of the flexible tube 116 need never come in contact with the mix 104 in the hopper 31. The stainless steel tube 118 may be easily removed from the flexible tube 116 for cleaning. The weight of the stainless steel tube 118 keeps the open distal end 119 thereof at the bottom of the liquid mix hopper 31. A proximal end of the flexible tube 116 is coupled to the filling aperture 51 formed through the back sealing plate 45 of the freezing barrel 26, e.g., via the fill tube coupling structure 53.

Liquid mix 104 is pumped from the liquid mix hopper 31 through the flexible tube 116 to the freezing barrel 26 by the liquid mix pumping mechanism 32. Preferably, a peristaltic pump 32 is used to pump the liquid mix 104 through the flexible tube 116. A peristaltic pump 32 operates to pump liquid mix through the flexible tube 116 by compressing the tube 116 in a manner so as to draw liquid mix 104 through the tube 116 without any component of the pump 32 itself contacting the liquid mix 104 passing through the tube 116. Thus, use of a peristaltic pump 32 to pump liquid mix 104 through the tube 116 is very sanitary. The pump 32 may be mounted within the frozen custard machine cabinet 22 anywhere along the flexible tube 116. For example, the pump 32 conveniently may be mounted on top of the refrigerated compartment 110 containing the liquid mix hopper 31.

Figure 10:
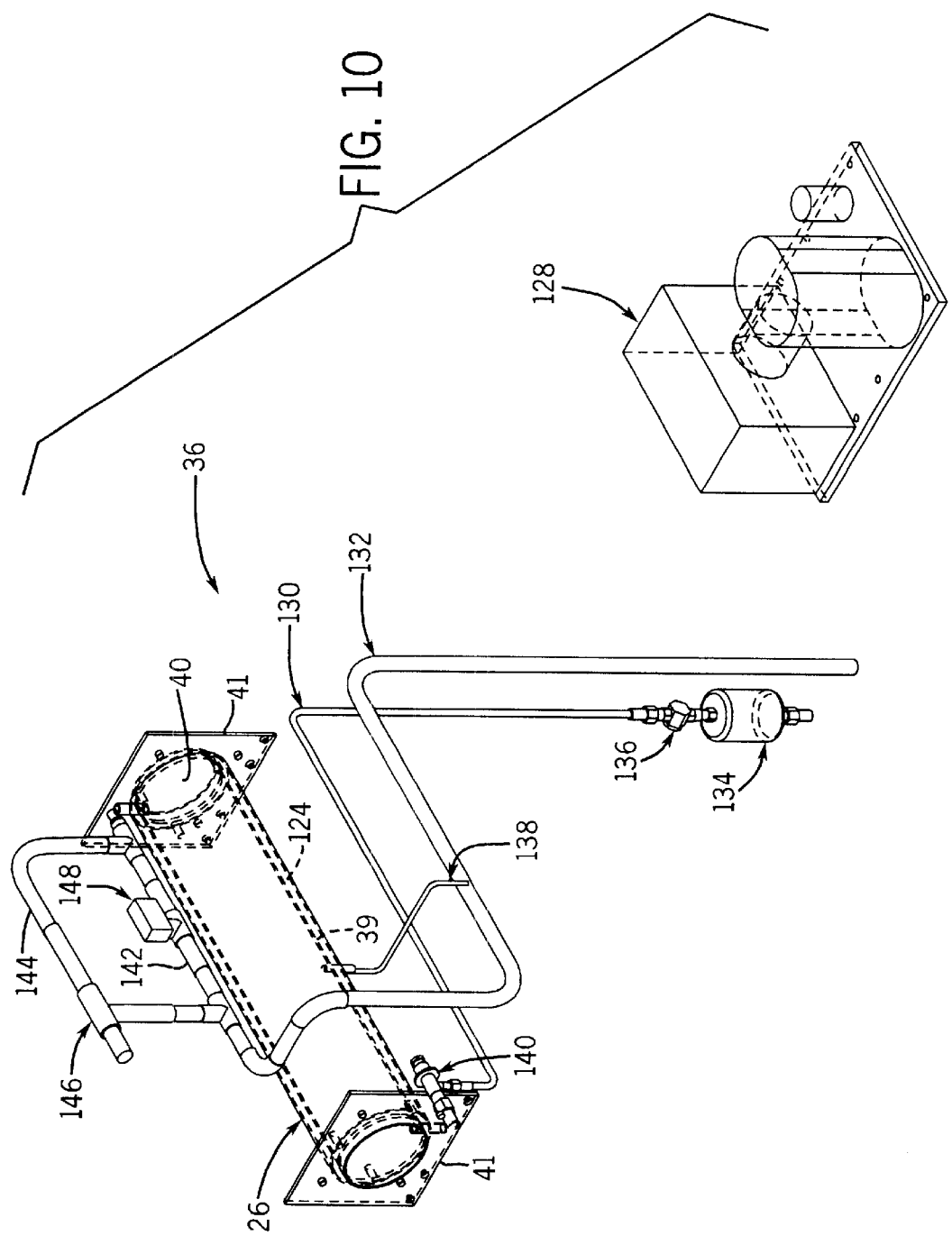
FIG. 10 is a perspective view illustration of an exemplary freezing barrel refrigeration system for a frozen custard machine in accordance with the present invention.

Chilling of the freezing barrel 26 is preferably accomplished by circulating refrigerant around the outer surface of the inner freezing barrel cylinder 39. This may be accomplished in a conventional manner by circulating a refrigerant through evaporator coils wrapped around the outer surface of the inner freezing barrel cylinder 39. However, it is preferred that chilling of the freezing barrel 26 be accomplished by circulating refrigerant through a space 124 formed between the inner surface of the outer freezing barrel cylinder 40 and the outer surface of the inner freezing barrel cylinder 39, which space forms an evaporator chamber through which refrigerant is passed to chill the freezing barrel 26. A flow of refrigerant through the evaporator chamber 124 surrounding the inner freezing barrel cylinder 39 is provided by the barrel freezing system 36. In accordance with the present invention, the barrel freezing system 36 allows for control of the flow of refrigerant to the evaporator chamber 124, thereby to control the chilling temperature of the freezing barrel 26 to different temperature levels for different production levels. An exemplary barrel freezing system 36 in accordance with the present invention will now be described in detail with reference to FIG. 10.

Pressurized refrigerant for the barrel freezing system 36 preferably is provided by a conventional condensing unit 128. The condensing unit 128 may be remotely located from the frozen custard machine 20 to which it is attached, e.g., outside of the room or building in which the machine 20 is in use. Any conventional refrigerant, e.g., 404-A refrigerant, may be employed. (Discharge pressure at the condensing unit 128 may be, e.g., 220–240 PSIG.)

The barrel freezing system 36 includes a liquid refrigerant supply line 130 and a refrigerant suction line 132, whereby refrigerant is provided to and removed from the evaporator chamber 124, respectively. In operation, the condensing unit 128 applies suction to the suction line 132, thereby drawing liquid refrigerant from the condensing unit 128, through the liquid refrigerant line 130 and into the evaporator chamber 124, wherein evaporation of the refrigerant chills the freezing barrel 26. Evaporated refrigerant is returned to the condensing unit in the suction line 132. A conventional filter drier 134 and sight glass 136 may be provided on the liquid refrigerant supply line 130. The filter drier 134 is provided to remove contaminants and water from the refrigerant passing through the freezing system. The sight glass 136 allows an operator of the system to determine visually if the level of refrigerant in the barrel freezing system 36 is low, requiring additional refrigerant to be added to the system. An oil drain line 138 may also be provided between a lower portion of the outer freezing barrel cylinder 40 and the suction line 132.

Liquid refrigerant is provided to the evaporator chamber 124 via an automatic expansion valve 140. The automatic expansion valve 140, which may be coupled in the liquid refrigerant supply line 130 near the freezing barrel 26, establishes a relatively low pressure level for the refrigerant passing into the evaporator chamber 124 (e.g., depending upon the desired freezing barrel temperature and refrigerant employed, the automatic expansion valve 140 may establish a refrigerant pressure level of 20–24 PSIG).

In accordance with the present invention, two alternative refrigerant paths may be provided by the barrel freezing system 36. The two paths, e.g., a lower pressure refrigerant path and a higher pressure refrigerant path, may be established by separate branches 142 and 144 of the suction line 132 formed near the freezing barrel 26. Refrigerant in the lower pressure path passes through the automatic expansion valve 140, the evaporator chamber 124 and the low pressure branch 142 of the suction line 132. Refrigerant in the higher pressure refrigerant path passes through the higher pressure branch 144 of the suction line 132 upon exiting the evaporator chamber 124. Refrigerant in the higher pressure path 144 is directed through an evaporator pressure regulating (EPR) valve 146. The EPR valve 146 establishes a higher pressure level for the refrigerant in the evaporator chamber 124. (For example, depending upon the desired freezing barrel temperature and the refrigerant employed, the EPR valve 146 may establish the pressure of the refrigerant in the evaporator chamber 124 at, e.g., 36–40 PSIG.) When refrigerant is provided to the evaporator chamber 124 via the lower pressure refrigerant path 142 a relatively lower freezing barrel chilling temperature is achieved. When refrigerant is provided to the evaporator chamber 124 via the higher pressure refrigerant path 144 a higher freezing barrel chilling temperature is achieved.

In accordance with the present invention, the flow of refrigerant through the evaporator chamber 124 may be controlled so as to flow through either the lower pressure 142 or higher pressure 144 path, thereby to provide the desired chilling level to the freezing barrel 26 depending upon the desired production rate selected by an operator of the frozen custard machine 20. Control of the flow of refrigerant through either the low 142 or high 144 pressure path may be achieved by a valve 148, e.g., a solenoid operated valve, connected in series with the suction line 132 along the low pressure branch 142 thereof When the solenoid valve 148 is opened, refrigerant flows through the evaporator chamber 124 via the low pressure branch 142. When the solenoid operated valve 148 is closed, refrigerant is directed through the higher pressure branch 144 of the suction line 132, through the EPR valve 146.

Figure 4:
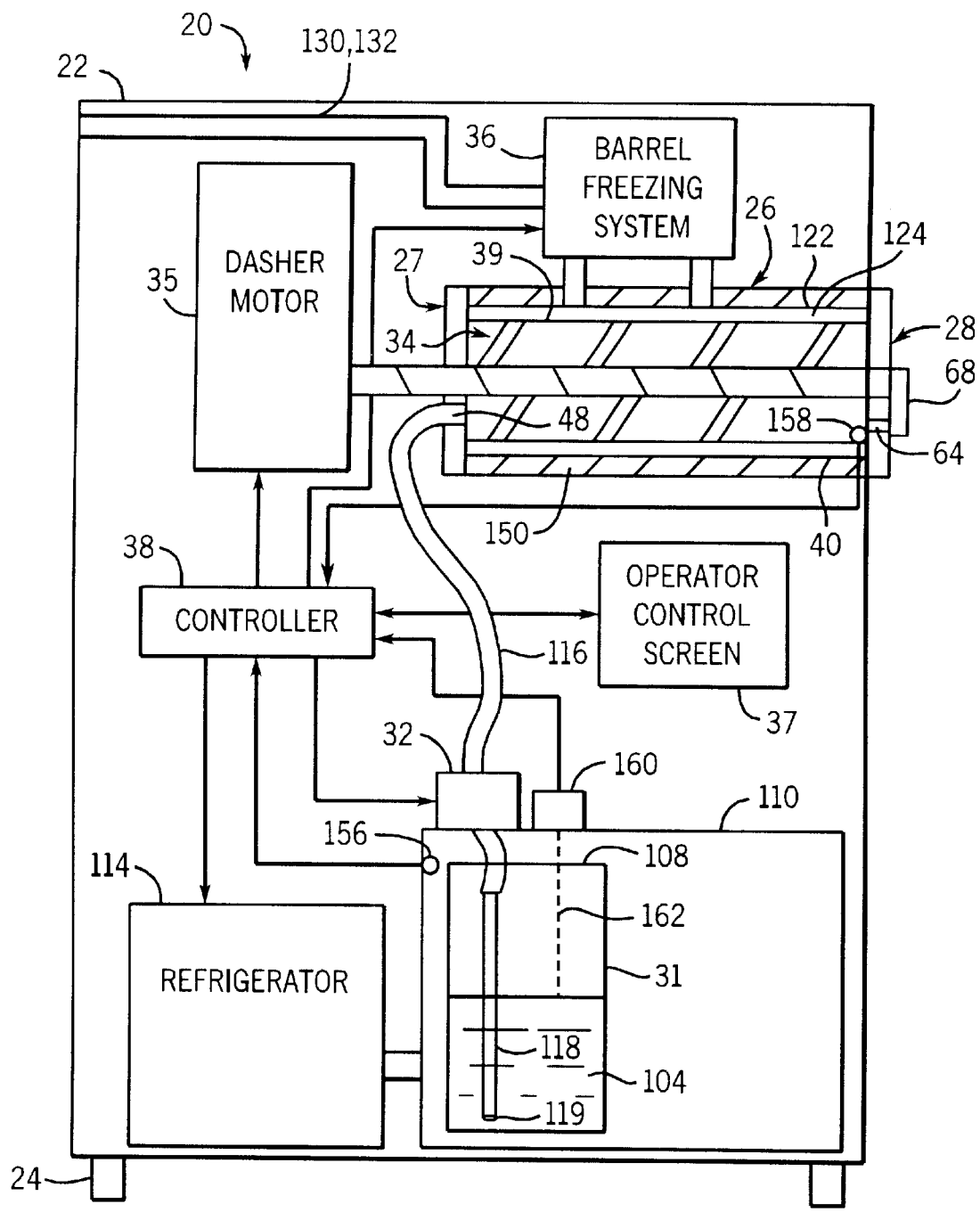
FIG. 4 is a schematic block diagram of the components of a frozen custard machine in accordance with the present invention.

To maximize chilling efficiency, and minimize the effect of ambient temperatures on effective chilling of the freezing barrel 26, the components of the barrel freezing system 36 which carry refrigerant are preferably insulated. For example, foam insulation may be wrapped or otherwise provided around the liquid refrigerant supply 130 and suction 132 lines. As illustrated in FIG. 4, the entire outer surface of the outer freezing barrel cylinder 40 preferably is surrounded by an insulating material 150, such as a thermally insulating foam material.

Returning now again to FIG. 4, operation of a frozen custard machine 20 in accordance with the present invention is preferably controlled by a system controller 38. The system controller 38 may be implemented in a conventional manner, using conventional control circuit components. The system controller 38 preferably may be implemented as a digital control system, e.g., using a microprocessor or discreet digital logic control circuitry. A preferred system controller 38 in accordance with the present invention may be implemented using a programmable logic controller or similar device.

The system controller 38 receives operator input commands from an operator control screen 37, which may be implemented as a touch screen or similar operator input device. (An exemplary operator control screen 37 for use with a frozen custard machine 20 in accordance with the present invention will be described in more detail below.) Based on commands received from the operator via the operator input device 37, the controller 38 provides control signals to various systems of the frozen custard machine 20 to control operation thereof in accordance with the operator's commands. For example, the controller 38 controls the speed of the dasher 34 disposed in the freezing barrel 26 by providing a control signal to control operation of the dasher motor 35 driving the dasher 34. The controller 38 controls the rate at which liquid mix is provided to the freezing barrel 26 by providing a control signal to control operation of the pump 32 for pumping liquid mix from the liquid mix hopper container 31 to the freezing barrel 26. The controller 38 controls the operating temperature of the freezing barrel 26 by, for example, controlling the operation of the solenoid valve 148 provided in the barrel freezing system 36, thereby to control the flow of refrigerant to the evaporator chamber 124 via either the low 142 or high 144 pressure refrigerant path. The low voltage control signals generated by the system controller 38 are provided to the devices controlled thereby via appropriate relays and drivers.

The controller 38 may also monitor various operating conditions of the frozen custard machine 20, and provide indications of those operating conditions to an operator on the operator control screen 37.

The controller 38 may automatically monitor and control the temperature of the refrigerated compartment 110 containing the liquid mix hoppers 31. For example, a conventional temperature sensor 156 may be provided in the refrigerated compartment 110. The temperature sensor 156 provides a signal related to the temperature of the interior of the refrigerated compartment 110 to the controller 38. In response, the controller 38 controls the refrigerator 114, e.g., by turning the refrigerator 114 on and off, to maintain the desired temperature within the refrigerated compartment 110, thereby to maintain the liquid mix 104 stored in the refrigerated compartment 110 at the desired temperature without freezing the liquid mix 104. (Alternatively, monitoring and control of the temperature of the refrigerated compartment 110 may be provided by a separate control system dedicated for this purpose, rather than by a main system controller 38.) The monitored temperature of the refrigerated compartment 110 may also be displayed by the controller 38, e.g., on the operator control screen 37.

The system controller 38 preferably also monitors the temperature of the frozen custard produced in the freezing barrel 26. For example, a conventional temperature sensor 158, such as a thermister, may be positioned in or near the freezing barrel 26 to detect the temperature of the frozen custard produced therein. For example, the temperature sensor 158 preferably may be positioned in or near the dispensing aperture 64, thereby to monitor the temperature of the final frozen custard product dispensed therethrough. The temperature sensor 158 provides a signal related to the temperature of the frozen custard produced in the freezing barrel 26 to the system controller 38. This frozen custard temperature information may, in turn, be displayed to an operator of the machine 20 on the operator control screen 37.

The system controller 38 preferably may also monitor the level of liquid mix 104 in the liquid mix hopper 31, and provide a warning to an operator when the level runs low. A conventional known method may be used for monitoring the level of liquid mix 104 in the hopper 31. However, in accordance with the present invention, monitoring the level of the liquid mix 104 in the hopper 31 preferably is provided in a very accurate and sanitary manner using a liquid mix level monitoring device which does not require physical contact with the liquid mix 104 itself.

In accordance with the present invention, an ultrasonic sensor 160 may be employed to measure the level of liquid mix 104 in a liquid mix hopper 31. A conventional ultrasonic distance sensor may be employed for this purpose. The ultrasonic sensor 160 preferably may be mounted in or to the refrigerated compartment 110, in a position thereon above the liquid mix hopper 31 positioned in the compartment 110. For example, the ultrasonic sensor 160 may be mounted outside and on top of the refrigerated compartment 110, with an aperture or window provided in the top portion of the refrigerated compartment 110 so as to allow the ultrasonic sensor 160 to direct an ultrasonic beam 162 downward through the open top 108 of the liquid mix hopper 31 to contact the surface of the liquid mix 104 in the hopper 31. The ultrasonic signal 162 is reflected back to the ultrasonic sensor 160. Based on the time of travel of the ultrasonic signal from the sensor 160 to the surface of the liquid mix 104, and back, the ultrasonic sensor 160 generates a signal corresponding to the distance between the ultrasonic sensor 160 and the surface of the liquid mix 104 in the hopper 31. This measurement signal, which is also related to the height, and, therefore, the level, of liquid mix 104 in the hopper 31, is provided to the system controller 38.

The system controller 38 monitors the signal provided by the ultrasonic sensor 160, and preferably may provide an audible and/or visual warning signal to an operator, e.g., on the operator control screen 37, when the liquid mix 104 in the hopper 31 is reduced to a low level. This warning indication allows an operator of the machine 20 to refill the liquid mix hopper 31 in the manner described above before the liquid mix 104 is completely drained from the hopper 31, thereby interrupting production. Since the ultrasonic sensor 160 detects the level of mix in the hopper 31 without physically contacting the liquid mix 104, the system and method for monitoring the level of liquid mix 104 in the hopper is both accurate and much more sanitary and labor saving than other systems, which might employ, for example, float devices or other detectors disposed in the liquid mix 104 for measuring the liquid mix level, and which must be cleaned periodically and are a possible source of contamination.

Figure 11:
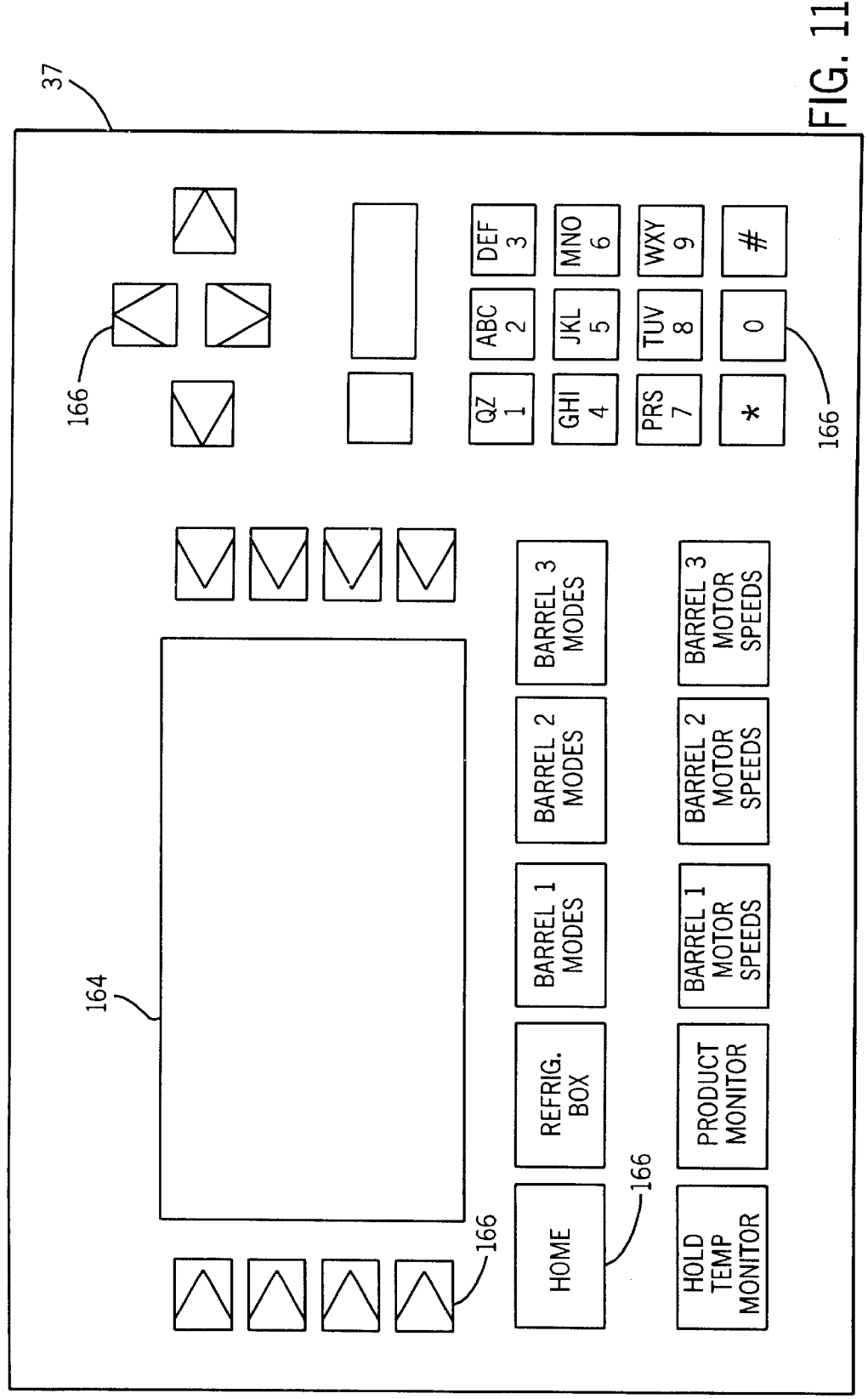
FIG. 11 is an exemplary operator control user interface for a frozen custard machine in accordance with the present invention.

An exemplary operator control screen user interface device 37 which may be employed in a frozen custard machine 20 in accordance with the present invention will now be described with reference to FIG. 11. A commercially available graphic operator control screen, touch screen, or a similar device, may be employed to implement the operator control screen input and display device 37. The operator control screen 37 preferably includes a display 164, such as, for example, a back-lit LED or touch screen display, for displaying operator command options and monitored system operating conditions to an operator. Buttons 166 or other input devices (e.g., designated areas on a touch screen) preferably are provided on the operator control screen input device 37, to allow an operator of the machine 20 to input information including machine operating parameters to the system controller 38 via the operator control screen 37. For example, the operator may be prompted on the display screen 164 to select from among a menu of possible operator commands displayed thereon using the buttons 166 positioned along side the display screen 164. A conventional touch screen user interface device, wherein the display screen 164 and operator input buttons 166 are integrated into the same device, may also be employed to implement the operator control screen user input device 37.

Exemplary operation of the exemplary operator control screen 37 illustrated in FIG. 11 will now be described. It should be understood, however, that the present invention is not in any way limited by the particular operator control screen input commands and options to be described.

Pressing the HOME button will display a customer logo, time of day, and the date, on the display screen 164.

Pressing the REFRIG. BOX button will display the controls for controlling the temperature of the refrigerated compartment 110 containing the liquid mix hopper 31. The subsequent control options displayed on the display 164 allow the operator to turn the refrigerator 114 for cooling the refrigerated compartment 110 on and off, and to display the temperature of the interior of the refrigerated compartment 110 (which should be between 34° F. and 41° F.). As discussed above, a thermister or thermocouple temperature sensor 156 positioned inside the refrigerated compartment 110 is used to measure the temperature therein.

Pressing the BARREL 1 MODES button will display controls for selecting a mode of operation of one of the freezing barrels 26 provided in the frozen custard machine 20. (Note that the exemplary operator control screen 37 being described is for a frozen custard machine 20 in accordance with the present invention including three independently operable freezing barrels 26.) The various modes of operation and other mode control options from which the operator may select will now be described.

Hold mode. If this mode is selected by the operator, the barrel freezing system 36 is operated, by turning on the compressor 128, to maintain the temperature of the freezing barrel between, e.g., approximately 35° F. and 41° F. The thermister or thermocouple temperature sensor (e.g., 158) positioned in the freezing barrel 26 is used to monitor the barrel temperature. The system controller 38 maintains the desired hold mode temperature in the freezing barrel 26 by turning the compressor 128 on and off as needed. Note that in hold mode neither the dasher motor 35 for rotating the dasher 34 in the freezing barrel 26 nor the pump 32 for pumping liquid mix into the freezing barrel 26 are operated.

Low production mode. In this mode, the barrel freezing system 36 is operated by turning on the compressor 128. The solenoid operated valve 148 is closed (this may be the default position of the valve 148) to provide refrigerant to the evaporator chamber 124 of the freezing barrel 26 via the high pressure refrigerant path 144. The dasher motor 35 is operated to rotate the dasher 34 in the freezing barrel 26 at a relatively low speed. The pump 32 for pumping liquid mix 104 from the liquid mix hopper 31 into the freezing barrel 26 is operated to pump liquid mix into the freezing barrel 26 at a relatively low rate.

High production mode. In this mode, the barrel freezing system 36 is also operated by turning on the compressor 128. The solenoid operated valve 148 is controlled to provide refrigerant to the evaporation chamber 124 of the freezing barrel 26 via the lower pressure refrigerant path 142, thereby chilling the freezing barrel 26 to a lower temperature level than in the low production mode. The dasher motor 35 is controlled to drive the dasher 34 at a higher speed than in the low production mode. The pump 32 is controlled to pump liquid mix 104 from the liquid mix hopper 31 into the freezing barrel 26 at a higher delivery rate than in the low production mode.

Clean mode. In this mode, the dasher motor 35 is controlled to drive the dasher 34 in the freezing barrel 26 at maximum speed, and the pump 32 is controlled to operate at maximum speed for pumping water and/or a cleaning fluid into and through the freezing barrel 26. (Note that for cleaning the machine in this mode, water and/or cleaning fluid is placed in the liquid mix hopper 31. Pumping the fluid through the tube 116 cleans the inside of the tube 116 connecting the hopper 31 to the freezing barrel 26, as well as the inside of the freezing barrel 26.) The barrel freezing system 36 is turned off during operation in the clean mode.

Mode off. This operator input option allows the operator to turn off any mode that is on. The compressor 128 in the barrel freezing system 36 is turned off and the dasher motor 35 and pump 32 are operated at a default speed.

Pump on/off. This operator control allows the operator to turn the pump 32 on and off independently of the selected operating mode.

Dasher on/off. This operator command allows the operator to turn the dasher motor 35 on and off independently of the operating mode selected.

Similar controls for selecting the mode of operation of the other freezing barrels 26 in the frozen custard machine 20 may be accessed by pressing the BARREL 2 MODES and BARREL 3 MODES buttons on the operator control screen 37. Preferably, operation of each freezing barrel 26 provided in a frozen custard machine 20 in accordance with the present invention having multiple freezing barrels is independently controllable.

HOLD TEMP MONITOR. Pressing this button will display the freezing barrel temperature for any freezing barrel 26 in the HOLD mode. The hold mode temperature may be displayed in any format, such as in an appropriate bar graph form, on the display screen 164. A temperature between 35° F. and 40° F. means the freezing barrel 26 is down to hold temperature. As discussed above, the freezing barrel temperature is monitored using a thermister or thermocouple or other temperature sensor mounted in or on the freezing barrel 26.

PRODUCT MONITOR. Pressing this button will display the product temperature range coming out of the barrel, e.g., in an appropriate bar graph or other format, on the display screen 164. As discussed above, a thermocouple temperature sensor 158 is positioned in or near the dispensing aperture 64 to measure the product temperature as frozen custard is dispensed therethrough. There is also a low mix indicator that flashes when the liquid mix 104 in a liquid mix hopper 31 is low. The liquid mix level may be detected by the ultrasonic sensor 160 mounted above the hopper 31 in the refrigerated compartment 110, as discussed above. Preferably, an audible alarm also sounds when a low mix level is detected in a liquid mix hopper 31.

BARREL 1 MOTOR SPEEDS. Pressing this button will display the speed of the pump 32 for delivering the liquid mix 104 from the liquid mix hopper 31 to the freezing barrel 26 and the speed of the dasher motor 35 driving the dasher 34 positioned in the freezing barrel 26. In accordance with the present invention, an operator is preferably also provided with control options which allow the operator to adjust the dasher motor 35 and pump 32 speeds within a preset range about the dasher motor 35 and pump speeds 32 set automatically by the system controller 38 based on the production mode (high or low) selected by the operator. For example, based on the temperature of the final frozen custard product, which may be monitored on the operator control screen 37, and/or the operator's visual observation of the consistency of the frozen custard produced by the machine 20, the operator may determine that the frozen custard produced by the machine 20 is slightly too warm or cold, soft or hard. By allowing the operator to increment or decrement the dasher motor 35 and pump 32 speed slightly about the preset speeds determined by the system controller 38, the operator is able to fine tune the quality and consistency of the product produced by the frozen custard machine 20. Thus, in accordance with the present invention, a frozen custard machine is provided in which various system operating parameters are automatically selected in response to an operator selected production rate, but wherein the operator is also able to adjust manually these parameters slightly to fine tune production quality and consistency. (Similar controls (e.g., BARREL 2 MOTOR SPEEDS, BARREL 3 MOTOR SPEEDS) are provided for each of the independently controlled freezing barrels 26 provided in the frozen custard machine 20.)

An exemplary procedure for operating a frozen custard machine in accordance with the present invention to produce frozen custard now will be described briefly. The freezing barrel back plate 27, front plate 28, and dasher 34 assemblies are assembled on the freezing barrel 26, as described above. Using the operator control screen 37, the refrigerator 140 for cooling the refrigerated compartment 110 containing the liquid mix hopper 31 is turned on. To make sure that the machine has been cleaned and sanitized, and that there is no cleaning solution left in the freezing barrel 26, the dasher motor 35 may be turned on to rotate the dasher 34 in the freezing barrel 26. With the cut off gate 68 open, the operator looks for any solution coming out of the dispensing aperture 64 in the face plate 56. If nothing is coming out of the freezing barrel 26, the dasher motor 35 may be turned off. With the freezing barrel 26 empty, the operator initially selects the hold mode of operation for the freezing barrel 26 using the operator control screen 37. While the operator is waiting for the freezing barrel 26 to chill to a production level, the appropriate liquid mix hopper 31 may be filled with liquid custard mix 104. The hold temperature of the freezing barrel 26 may be monitored using the operator control screen 37 in the manner described above. When the freezing barrel temperature is at approximately 30–35° F., the freezing barrel 26 is ready to make custard. Either a high or low production mode may now be selected using the operator control screen 37, and the dasher motor 35 and pump 32 are turned on. As discussed above, if a low rate of production is selected, the dasher motor 35 is automatically operated to rotate the dasher 34 in the freezing barrel 26 at a relatively low speed, the pump 32 is automatically operated to pump liquid mix 104 into the freezing barrel 26 at a relatively low rate, and the barrel freezing system 36 is automatically operated to chill the freezing barrel 26 at a relatively higher temperature level. If a higher rate of production mode is selected, the dasher motor 35 is operated to rotate the dasher 34 at a higher speed, the pump 32 is operated to deliver liquid mix 104 to the freezing barrel 26 at a higher rate, and the barrel freezing system 36 is operated to chill the freezing barrel 26 to a lower temperature level. Once production begins in either mode, the cut off gate 68 may be opened to allow frozen custard to be delivered through the dispensing aperture 64.

During production, the operator may employ the operator control screen 37 to monitor the temperature of the frozen custard dispensed from the machine 20. If the monitored temperatures are too high or too low, or the product consistency does not appear appropriate, the operator may employ the operator control screen 37 to adjust (increase or decrease) the dasher motor 35 and pump 32 speeds for a limited range about the speeds pre-selected based on the selected production rate, thereby to fine tune production.

A low mix light on the operator control screen 37 (or other visual and/or audible indicators) will come on when the level of liquid mix 104 in the hopper 31 indicates that the liquid mix in the hopper is just about gone. At this time, the hopper 31 can be refilled, or production can be stopped. To stop production, the operator control 37 screen may be used to turn off the previously selected production mode and to turn off the pump 32 for delivering liquid mix to the freezing barrel 26. The dasher motor 35 may be left on to rotate the dasher 34 until all custard is run out of the freezing barrel 26. At this time, the freezing barrel 26 can be cleaned with water and a cleaning solution, e.g., using the cleaning mode of operation, which may be selected using the operator control screen 37.

It is understood that the present invention is not limited in any way to the particular exemplary embodiments and illustrations provided herein, but encompasses all variations thereof which come within the scope of the following claims.

What is claimed is:

1. An apparatus for making a frozen confection product, comprising:
   (a) a freezing barrel having a first end and a second end with a dispensing aperture formed therein;
   (b) a liquid mix container;
   (c) a pump for providing liquid mix from the liquid mix container to the first end of the freezing barrel at a liquid mix delivery rate;
   (d) a dasher positioned in the freezing barrel for rotational movement therein;
   (e) a dasher motor coupled to the dasher to drive the dasher at a dasher speed to propel the frozen confection product through the freezing barrel and out of the dispensing aperture at a selected product production rate;
   (f) a refrigeration system for chilling the freezing barrel to a chilling level;
   (g) a user interface enabling a user to select between at least a high production rate and a low production rate; and
   (h) a system controller coupled to the user interface, the pump, the dasher motor, and the refrigeration system and adapted automatically
      to control the pump to pump liquid mix at a first delivery rate in response to a user selecting a high production rate and to control the pump to pump liquid mix at a second delivery rate in response to a user selecting a low production rate, wherein the first delivery rate is higher than the second delivery rate,
      to control the dasher motor to drive the dasher at a first dasher speed in response to a user selecting a high production rate and to control the dasher motor to drive the dasher at a second dasher speed in response to a user selecting a low production rate, wherein the first speed is higher than the second speed, and
      to control the refrigeration system to chill the freezing barrel to a first chilling level in response to a user selecting a high production rate and to control the refrigeration system to chill the freezing barrel to a second chilling level in response to a user selecting a low production rate, wherein the first chilling level is at a lower temperature level than the second chilling level.

2. The apparatus for making a frozen confection product of claim 1 wherein the liquid mix container is positioned in a refrigerated compartment and is coupled to the first end of the freezing barrel by tubing.

3. The apparatus for making a frozen confection product of claim 2 wherein the pump is a peristaltic pump coupled to the tubing coupling the liquid mix container to the freezing barrel.

4. The apparatus for making a frozen confection product of claim 1 wherein the refrigeration system includes refrigerant lines for providing pressurized refrigerant to the freezing barrel, and wherein the system controller is adapted to control the pressure of the refrigerant provided to the freezing barrel to a first pressure level to provide the first chilling level and to a second pressure level to provide the second chilling level.

5. The apparatus for making a frozen confection product of claim 4 wherein the refrigerant lines provide pressurized refrigerant to the freezing barrel via at least a lower pressure refrigerant path and a higher pressure refrigerant path, and comprising additionally a refrigeration system valve coupled to the refrigerant lines and the system controller and operated by the system controller to direct refrigerant to the freezing barrel through the lower pressure path to provide the first chilling level and through the higher pressure path to provide the second chilling level.

6. The apparatus for making a frozen confection product of claim 5 wherein the refrigeration system valve is a solenoid operated valve coupled to the system controller for operation thereby.

7. The apparatus for making a frozen confection product of claim 5 wherein the higher pressure refrigerant path includes an evaporator pressure regulating valve positioned therein for establishing a pressure level in the higher pressure refrigerant path when refrigerant is directed by the refrigeration system valve through the higher pressure refrigerant path.

8. The apparatus for making a frozen confection product of claim 1 comprising additionally an ultrasonic sensor positioned above the liquid mix container for providing an ultrasonic sensor signal relative to a level of liquid mix in the liquid mix container.

9. The apparatus for making a frozen confection product of claim 8 wherein the system controller is coupled to the ultrasonic sensor to receive the ultrasonic sensor signal therefrom and is adapted to monitor the ultrasonic sensor signal and to provide an indication when the ultrasonic sensor signal indicates that the level of liquid mix in the liquid mix container is below a selected level.

10. The apparatus for making a frozen confection product of claim 1 wherein the user interface includes a user interface selected from the group of user interfaces consisting of operator control screens and touch screens.

11. The apparatus for making a frozen confection product of claim 1 wherein the system controller includes a digital controller and relays coupling the digital controller to the pump, dasher motor, and refrigeration system.

12. A method for making a frozen confection product, comprising:
   (a) selecting between at least a high product production rate and a low product production rate;
   (b) providing automatically a liquid mix at a first delivery rate to a first end of a freezing barrel in response to selecting a high production rate and providing automatically liquid mix at a second delivery rate to the first end of the freezing barrel in response to selecting a low production rate, wherein the first delivery rate is higher than the second delivery rate;

(c) driving automatically a dasher positioned in the freezing barrel for rotational movement therein at a first dasher speed in response to selecting a high production rate and driving automatically the dasher at a second dasher speed in response to selecting a low production rate, wherein the first dasher speed is higher than the second dasher speed, and whereby the dasher propels the frozen confection product through the freezing barrel and out of a dispensing aperture formed at a second end of the freezing barrel at the selected product production rate; and (d) chilling automatically the freezing barrel to a first chilling level in response to selecting a high production rate and chilling automatically the freezing barrel to a second chilling level in response to selecting a low production rate, wherein the first chilling level is at a lower temperature level than the second chilling level.

13. The method of claim 12 wherein selecting between at least a high product production rate and a low product production rate includes entering a selection into a user interface.

14. The method of claim 12 wherein providing automatically a liquid mix at first and second delivery rates to the first end of a freezing barrel includes controlling a pump to pump liquid mix from a liquid mix container to the first end of the freezing barrel at the first and second delivery rates.

15. The method of claim 14 comprising additionally refrigerating liquid mix in the liquid mix container.

16. The method of claim 12 wherein driving automatically a dasher at first and second dasher speeds includes controlling a dasher motor coupled to the dasher to drive the dasher at the first and second dasher speeds.

17. The method of claim 12 wherein chilling automatically the freezing barrel to a first chilling level and a second chilling level includes controlling a pressure of a refrigerant provided to the freezing barrel to a first pressure level to provide the first chilling level and to a second pressure level to provide the second chilling level.

18. The method of claim 17 wherein controlling a pressure of a refrigerant provided to the freezing barrel to the first and second pressure levels includes providing pressurized refrigerant to the freezing barrel via at least a lower pressure refrigerant path and a higher pressure refrigerant path, providing a refrigeration system valve, and controlling the refrigeration system valve to direct refrigerant to the freezing barrel through the lower pressure path to provide the first chilling level and through the higher pressure path to provide the second chilling level.

19. The method of claim 12 comprising additionally manually adjusting the delivery rate of the liquid mix to the freezing barrel within a range of delivery rates around the first delivery rate following selecting a high production rate and within a range of delivery rates around the second delivery rate following selecting a low production rate.

20. The method of claim 12 comprising additionally manually adjusting the dasher speed within a range of dasher speeds around the first dasher speed following selecting a high production rate and within a range of dasher speeds around the second dasher speed following selecting a low production rate.

21. The method of claim 12 comprising additionally positioning an ultrasonic sensor above the liquid mix in a liquid mix container for directing an ultrasonic signal toward and receiving a reflected ultrasonic signal from a top surface of a liquid mix in the liquid mix container to provide an ultrasonic sensor signal relative to a level of liquid mix in the liquid mix container.

22. The method of claim 21 comprising additionally providing an indication when the ultrasonic sensor signal indicates that a level of liquid mix in the liquid mix container is below a selected level.

* * * * *